(12) United States Patent
Kawabe et al.

(10) Patent No.: US 8,602,544 B2
(45) Date of Patent: Dec. 10, 2013

(54) INK SET, INK CARTRIDGE, INK JET RECORDING METHOD, AND INK JET RECORDING APPARATUS

(75) Inventors: Minako Kawabe, Koganei (JP); Jun Yoshizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 12/955,347

(22) Filed: Nov. 29, 2010

(65) Prior Publication Data

US 2011/0141186 A1    Jun. 16, 2011

(30) Foreign Application Priority Data

Dec. 11, 2009    (JP) ................................. 2009-282281

(51) Int. Cl.
*B41J 2/01* (2006.01)

(52) U.S. Cl.
USPC ............................................ 347/95; 347/100

(58) Field of Classification Search
USPC ......... 347/100, 95, 96, 101, 88, 99, 20, 21, 9; 106/31.6, 31.27, 31.13; 523/160, 161
See application file for complete search history.

(56) References Cited

U.S. PATENT DOCUMENTS

| | | | |
|---|---|---|---|
| 6,874,882 B2 | 4/2005 | Taguchi et al. | |
| 6,966,944 B2 | 11/2005 | Shimomura et al. | |
| 7,144,452 B2 | 12/2006 | Takayama et al. | |
| 7,160,372 B2 | 1/2007 | Yoshizawa et al. | |
| 7,208,033 B2 | 4/2007 | Kawabe et al. | |
| 7,226,498 B2 | 6/2007 | Yamashita et al. | |
| 7,241,332 B2 | 7/2007 | Yoshizawa et al. | |
| 7,244,299 B2 | 7/2007 | Tsuji et al. | |
| 7,247,194 B2 | 7/2007 | Okamura et al. | |
| 7,247,196 B2 | 7/2007 | Sato et al. | |
| 7,270,701 B2 | 9/2007 | Jinnou et al. | |
| 7,285,159 B2 | 10/2007 | Aikawa et al. | |
| 7,294,184 B2 | 11/2007 | Fujimoto et al. | |
| 7,297,194 B2 | 11/2007 | Shinjo et al. | |
| 7,297,197 B2 | 11/2007 | Jinnou et al. | |
| 7,364,770 B2 | 4/2008 | Nagashima et al. | |
| 7,445,666 B2 | 11/2008 | Yanagimachi et al. | |
| 7,507,282 B2 | 3/2009 | Ozawa et al. | |
| 7,510,605 B2 | 3/2009 | Harada et al. | |
| 7,550,037 B2 | 6/2009 | Mafune et al. | |
| 7,553,358 B2 | 6/2009 | Okamura et al. | |
| 7,566,362 B2 | 7/2009 | Mori et al. | |
| 7,591,888 B2 | 9/2009 | Fujii et al. | |
| 7,611,571 B2 | 11/2009 | Yamashita et al. | |
| 7,618,484 B2 | 11/2009 | Fujimoto et al. | |
| 7,637,603 B2 | 12/2009 | Kawabe et al. | |
| 7,648,943 B2 | 1/2010 | Fujiwara et al. | |
| 7,678,185 B2 | 3/2010 | Matsumoto et al. | |
| 7,740,695 B2 | 6/2010 | Kitamura et al. | |
| 7,771,525 B2 | 8/2010 | Morita et al. | |
| 7,866,808 B2 * | 1/2011 | Hayashida et al. | ........... 347/100 |
| 2004/0139882 A1 | 7/2004 | Taguchi et al. | |
| 2006/0009357 A1 | 1/2006 | Fujiwara et al. | |
| 2006/0016368 A1 | 1/2006 | Ozawa et al. | |
| 2007/0022902 A1* | 2/2007 | Koga | ......................... 106/31.27 |
| 2008/0168923 A1* | 7/2008 | Iwamura et al. | ........... 106/31.13 |
| 2008/0199615 A1 | 8/2008 | Harada et al. | |
| 2008/0274283 A1 | 11/2008 | Tateishi et al. | |
| 2008/0299316 A1* | 12/2008 | Hayashida et al. | ........ 106/31.13 |
| 2008/0302270 A1* | 12/2008 | Taniguchi et al. | ......... 106/31.13 |
| 2009/0000511 A1 | 1/2009 | Kitamura et al. | |
| 2009/0029120 A1 | 1/2009 | Fujii et al. | |
| 2009/0238974 A1 | 9/2009 | Kawabe et al. | |
| 2009/0238977 A1 | 9/2009 | Kawabe et al. | |
| 2009/0286051 A1 | 11/2009 | Matsumoto et al. | |
| 2009/0295886 A1 | 12/2009 | Yoshizawa et al. | |
| 2010/0068475 A1 | 3/2010 | Morita et al. | |

FOREIGN PATENT DOCUMENTS

| | | |
|---|---|---|
| JP | 2003-231834 A | 8/2003 |
| JP | 2004-107633 A | 4/2004 |
| JP | 2004-107638 A | 4/2004 |
| JP | 2005-075778 A | 3/2005 |
| JP | 2005-162823 A | 6/2005 |
| JP | 2006-143989 A | 6/2006 |
| JP | 3851569 B2 | 11/2006 |
| JP | 2007-138124 A | 6/2007 |
| JP | 2008-081693 A | 4/2008 |
| WO | 2006/082669 A1 | 8/2006 |
| WO | 2007/091631 A1 | 8/2007 |
| WO | 2007/120964 A1 | 10/2007 |
| WO | 2008/053776 A1 | 5/2008 |
| WO | 2008/062662 A1 | 5/2008 |
| WO | 2008/066062 A1 | 6/2008 |

* cited by examiner

*Primary Examiner* — Manish S Shah

(74) *Attorney, Agent, or Firm* — Fitzpatrick, Cella, Harper & Scinto

(57) ABSTRACT

An ink set having a cyan ink, a magenta ink and a yellow ink. A combination of a cyan, magenta and yellow dye respectively contained in the cyan, magenta and yellow ink is selected so as to satisfy the condition that optical density retentions of images formed by a cyan ink for evaluation containing the cyan dye, a magenta ink for evaluation containing the magenta dye and a yellow ink for evaluation containing the yellow dye, as determined before and after an ozone resistance test with an integral ozone concentration of 800 ppm·hr and before and after a xenon light resistance test with an integral irradiance of 43,800 klx·hr, are 70% or more for each of the inks for evaluation and are such that a maximum value of differences of the optical density retentions among the images formed by the respective inks for evaluation is 15 or less.

10 Claims, No Drawings

INK SET, INK CARTRIDGE, INK JET RECORDING METHOD, AND INK JET RECORDING APPARATUS

BACKGROUND OF THE INVENTION

1. Field of the Invention

The present invention relates to an ink set, an ink cartridge, an ink jet recording method, and an ink jet recording apparatus.

2. Description of the Related Art

In recent years, the image quality of a recorded article obtained by an ink jet recording method has been remarkably enhanced, and a recorded article has increasingly been stored for a long period of time in exhibition or the like. For this reason, ink has been required to be able to form an image superior not only in color developability but also in image storage stability. The image storage stability includes various characteristics such as gas resistance, light resistance, humidity resistance and water resistance, but it is necessary to particularly enhance the gas resistance and the light resistance of the image storage stability, supposing exhibition of the recorded article.

A coloring material to be used in an ink for an ink jet includes dye and pigment. An ink containing dye shows adequate color developability compared to an ink containing pigment, and can form an image having superior gloss using a recording medium having gloss. However, the image obtained by the ink containing dye is inferior in the performance of the gas resistance and the light resistance compared to the ink containing pigment.

Conventionally, a study for improving the molecular structure of the dye has been in a mainstream, as a measure for enhancing the gas resistance and the light resistance of the image formed by the ink containing the dye. However, it is hard to say that sufficient image storage stability can be obtained by enhancing the gas resistance and the light resistance of an image obtained only for an ink of a certain single color, through a contrivance of a molecular structure. This is because when the performances of the light resistance and the gas resistance are different among images formed by a plurality of inks, an image region formed by an ink having a low performance early fades or discolors than an image region formed by other inks, resulting in an insufficiently balanced image as a whole.

There are proposals concerning a method of equalizing the deterioration rate of each ink, as a method of enhancing the balance of the image storage stability for the whole image (Japanese Patent Application Laid-Open Nos. 2004-107633 and 2004-107638). Japanese Patent Application Laid-Open Nos. 2004-107633 and 2004-107638 disclose a method of enhancing ozone resistance or light-resistance of a single color in each ink constituting an ink set and a method of equalizing the performance of the light resistance or the ozone resistance among images formed by each ink. Japanese Patent Application Laid-Open No. 2008-081693 describes improving performance of an ink itself by the contrivance of a coloring material to be used in the ink, achieving the image storage stability balanced among a plurality of inks, and achieving improvement in both ozone resistance and fluorescent lamp resistance. There are also proposals concerning the enhancement of the fastness of an image by enhancing association properties of dye (Japanese Patent Application Laid-Open No. 2005-162823), and imparting fastness comparable to that of other inks to a yellow dye having relatively inferior fastness by using a dye having a specific structure (Japanese Patent Application Laid-Open No. 2007-138124).

The present inventors conducted an ozone resistance test and a xenon light resistance test in order to evaluate the image storage stability of recorded articles which had been produced by using an ink set described in each of the above-described patent documents when exhibited at places of various conditions.

As a result, it was found that the ink set in which the balance was considered from the viewpoint of the light resistance as described in Japanese Patent Application Laid-Open No. 2004-107633 and the ink set described in Japanese Patent Application Laid-Open No. 2004-107638, in which the balance was considered from the viewpoint of the ozone resistance were certainly enhanced to some extent in the point of the balance in each test. However, it was found that each ink described in these patent documents originally had a low performance of the ink itself, accordingly the image could not be considered to have sufficient image storage stability compared to the image before the test, and besides, could not achieve both ozone resistance and xenon light resistance. In addition, when the fastness of the image against light while the recorded article is exhibited in various environments is considered, the performance of the light resistance needs to be determined by the performance against the xenon light having wavelengths similar to those of sunlight. However, the ink set described in Japanese Patent Application Laid-Open No. 2008-081693, in which the balance of the fluorescent lamp resistance was considered, was found not to have a sufficient performance on the xenon light resistance. Furthermore, the ink sets described in Japanese Patent Application Laid-Open Nos. 2005-162823 and 2007-138124 were found to have approximately equal fastness among three types of inks to achieve both the ozone resistance and the xenon light resistance, but not to satisfy the image storage stability of a high level which is required in recent years.

Accordingly, an object of the present invention is to provide an ink set in which each ink constituting the ink set achieves ozone resistance and xenon light resistance at a high level, and shows a superior balance between the ozone resistance and the xenon light resistance as well. In addition, another object of the present invention is to provide an ink cartridge, an ink jet recording method and an ink jet recording apparatus, which use the above-described ink set.

SUMMARY OF THE INVENTION

The above-described objects are achieved by the following present invention. Specifically, an ink set according to the present invention is an ink set comprising a cyan ink, a magenta ink and a yellow ink, wherein a combination of a cyan dye contained in the cyan ink, a magenta dye contained in the magenta ink and a yellow dye contained in the yellow ink is selected so as to satisfy the condition that optical density retentions of images formed by a cyan ink for evaluation containing the cyan dye, a magenta ink for evaluation containing the magenta dye and a yellow ink for evaluation containing the yellow dye, as determined before and after an ozone resistance test with an integral ozone concentration of 800 ppm·hr and before and after a xenon light resistance test with an integral irradiance of 43,800 klx·hr, are 70% or more for each of the inks for evaluation and are such that the maximum value of differences of the optical density retentions among the images formed by the respective inks for evaluation is 15 or less.

The present invention can provide an ink set in which each ink constituting the ink set achieves both ozone resistance and xenon light resistance at a high level, and shows a superior balance between the ozone resistance and the xenon light resistance as well. In addition, another embodiment according to the present invention can provide an ink cartridge, an ink jet recording method and an ink jet recording apparatus, which use the above-described ink set.

Further features of the present invention will become apparent from the following description of exemplary embodiments.

DESCRIPTION OF THE EMBODIMENTS

Preferred embodiments of the present invention will be described below in detail.

In recent years, it is an essential condition for an image having been formed with an ink jet recording method using an ink containing dye to have a strong resistance to both gas and light which are main causes of the deterioration of the image in an environment in which the image is stored. Then, the present inventors supposed various environments in which the image is stored, and thought that it is important for the image to achieve both the image storage stability against ozone gas (ozone resistance) and the image storage stability against xenon light (xenon light resistance) having a wavelength similar to sunlight, at a high level. Furthermore, as for the hue of the ink, three types of inks of cyan, magenta and yellow which are basic colors of subtractive mixture greatly give an influence to an image to be formed, and these respective inks need to achieve both the ozone resistance and the xenon light resistance, at a high level. In addition to the above-described conditions, in order not to make the deterioration of the image formed by the inks visually felt, the deterioration behaviors of each image formed by the three types of inks need to be balanced. This is because when the ozone resistance and the xenon light resistance of each ink are low, the image is easy to quickly fade even when the deterioration behaviors are balanced, and the deterioration of the image is visually felt. On the other hand, this is because when the deterioration behaviors of the three types of the inks are different and are not balanced, discoloration tends to quickly proceed only in the image portion which has been formed by some of the inks, even when the ozone resistance and the xenon light resistance of each ink are high, and in this case as well, the deterioration of the image is visually felt.

The image which has been obtained through an ink jet recording method is stored in various environments. For instance, the image is exhibited as it is in some cases, and is stored in a frame covered with glass in other cases. Then, the present inventors made an investigation on test conditions for the ozone resistance and the xenon light resistance, in which the deterioration of the image is kept at such a level as not to be visually felt, by examining a correlation between the deterioration behavior of the image concerning the ozone gas and the xenon light and an acceleration test, in an environment in which the image is stored.

Firstly, a situation in which the image receives an influence of ozone gas in particular, among various environments in which the image is stored, includes the case in which the image is exhibited as it is in a well-ventilated environment. When the image is stored in such an environment, it is required that the deterioration of the image is not visually felt for a period corresponding to approximately 20 years. On the other hand, when the image is stored in an environment other than the above-described environment, the ozone gas relatively gives little influence to the image, accordingly it can be considered that as long as the environment satisfies the above-described condition, the image does not substantially deteriorate even if the environment in which the image is actually stored is any environment. An acceleration test for reproducing the deterioration of the image corresponding to approximately 20 years due to the ozone gas needs to expose the image to an integral ozone concentration of 800 ppm·hr. This acceleration test is based on a Digital Color Photo Print Stability Evaluation (JEITA CP-3901) published by Japan Electronics and Information Technology Industries Association (JEITA (registered trademark, hereinafter the same)).

Next, a situation in which the image receives the influence of light in particular, among various environments in which the image is stored, is the case in which the image stored in the frame covered with glass receives sunlight through a glass window. When the image is stored in such an environment, it is required that the deterioration of the image is not visually felt for a period corresponding to approximately 40 years. On the other hand, when the image is stored in an environment other than the above-described environment, the light relatively gives little influence to the image, and accordingly it can be considered that as long as the environment satisfies the above-described condition, the image does not substantially deteriorate even if the environment in which the image is actually stored is any environment. An acceleration test for reproducing the deterioration of the image corresponding to approximately 40 years due to the xenon light needs to expose the image to an integral irradiance of 43,800 klx·hr. This acceleration test is also based on JEITA CP-3901, similarly to the above-described ozone resistance.

In summary, supposing that the image is stored in various environments, the test conditions need to satisfy the following conditions. Specifically, it is necessary to control the performance of each ink and the deterioration behaviors among the inks to be in a certain range, which are obtained by conducting an acceleration test on the condition of 800 ppm·hr integral ozone concentration for the ozone resistance and on the condition of 43,800 klx·hr integral irradiance for the xenon light resistance; and by evaluating the state of the image by calculating the values of the optical density retentions (of which the detailed calculation method will be described later) from the values of the optical densities obtained by measuring the image before and after the acceleration test (of which the detailed test condition will be described later) based on the above-described conditions, for each of the ozone resistance and the xenon light resistance.

According to JEITA CP-3901, it is certified that the deterioration of the image is not perceived when the optical density retention of the image formed by each ink is 70% or more, and when a difference of the optical density retention among each color component in a black image is 15 or less. As for the latter, when discoloration quickly proceeds only some of the inks used for forming the black image, the deterioration of the black image is easy to be visually felt. Accordingly, it can be considered that when the maximum value of differences of the optical density retentions among the images formed by each ink constituting the black image is 15 or less, the discoloration of the black image is not perceived. On the other hand, when the optical density retention of the image formed by the ink is less than 70%, the deterioration of the image due to fading is perceived because the performance of the ink itself is insufficient. In addition, when the maximum value of differences of the optical density retentions among the images formed by each ink is more than 15, the deterioration of the image due to the discoloration results in being perceived.

When the optical density retention of the image formed by each ink is 70% or more and the maximum value of differences of the optical density retentions among the images formed by each ink, is 15 or less in the ozone resistance test and the xenon light resistance test based on the above-described conditions, superior image storage stability is attained. In the present invention, particularly superior image storage stability can be attained when the results of the ozone resistance test and the xenon light resistance test can further satisfy the above-described optical density retention and the maximum value of the differences even in the following respective conditions.

Specifically, even when the ozone resistance test is conducted on the condition of an integral ozone concentration of 1,000 ppm·hr, it is preferable to satisfy the condition that the optical density retention of the image formed by each ink be 70% or more and the maximum value of the differences of the optical density retentions among the images formed by each ink be 15 or less. The ozone resistance test to be conducted on the condition of the integral ozone concentration of 1,000 ppm·hr is an acceleration test for reproducing the deterioration of the image corresponding to approximately 25 years due to the ozone gas. In addition, even when the xenon light resistance test is conducted on the condition of the integral irradiance of 65,700 klx·hr, it is preferable to satisfy the condition that the optical density retention of the image formed by each ink be 70% or more and the maximum value of the differences of the optical density retentions among the images formed by each ink be 15 or less. The xenon light resistance test to be conducted on the condition of the integral irradiance of 65,700 klx·hr is an acceleration test for reproducing the deterioration of the image corresponding to approximately 60 years due to the xenon light. In addition, these acceleration tests are also based on JEITA CP-3901.

An imbalance of the image is not perceived in the environment in which the image is stored, if the maximum value of the difference between the optical density retentions is 15 or less in each of the above-described test conditions, but in the present invention, in particular, the maximum value of the difference between the optical density retentions preferably satisfies 10 or less.

Optical Density Retention

The state of the image before and after the above-described ozone resistance test and xenon light resistance test is evaluated with the optical density retention, and here the calculation method for the optical density retention will be described below. Firstly, a cyan ink for evaluation, a magenta ink for evaluation and a yellow ink for evaluation are prepared, which contain a cyan dye, a magenta dye and a yellow dye, respectively. The detail of the inks for evaluation will be described later. Then, each ink for evaluation is used solely, and a solid image is formed in which the recording duty is gradually changed. Then, the optical density of each solid image is measured. In Examples which will be described later, the optical density was measured with the use of a spectrophotometer (Spectrolino; product made by Gretag Macbeth Co.) under conditions of a light source of D50, a visual field of 2 degrees, an incident angle of 45°, and a light-receiving angle of 0°. The optical density in an image region having the optical density of 1.0±10% is referred to as "optical density before test". For information, the vicinity of the optical density of 1.0 is an average optical density in the recorded article to be obtained through an ink jet recording method, and accordingly can be considered to be particularly suitable for evaluating the performance of a dye. Then, the ozone resistance test or the xenon light resistance test is conducted on predetermined conditions which will be described later, and the optical density is measured on the same region as the image region in which the optical density was measured before the test. This optical density is referred to as "optical density after test". The optical density retention is defined by the value to be calculated from each of the optical densities before and after the test based on the following formula.

$$\text{Optical density retention}[\%] = \frac{\text{Optical density after test}}{\text{Optical density before test}} \times 100$$

The image generally deteriorates by the ozone resistance test or the xenon light resistance test, and the optical density is lowered. Accordingly, it is extremely rare that the optical density after the test becomes higher than the optical density before the test, and it can be considered that the value of the optical density retention never exceeds 100%. As the value of the optical density retention is higher, the image less deteriorates, which accordingly means that the dye is more excellent in image storage stability.

In addition, among the optical density retentions obtained by the calculation for the images formed by each ink for evaluation in the above-described way, a difference between the maximum value and the minimum value is "the maximum value of differences of the optical density retentions among images formed by each ink for evaluation". For instance, when the optical density retention of the image formed by the cyan ink for evaluation is A % and is the highest among the inks for evaluation and the optical density retention of the image formed by the yellow ink for evaluation is B% and is the lowest among the inks for evaluation, the value of the difference between the optical density retentions is (A-B). The smaller the maximum value of the difference between the optical density retentions of the images formed by each ink for evaluation, the smaller the difference of the deterioration behaviors of each dye, which means that the balance of the image storage stability is not deteriorated. The difference between the maximum value and the minimum value is 0 most preferably.

Ozone Resistance Test

An ozone resistance test for determining the performance of the dye contained in each ink constituting the ink set according to the present invention is conducted with the use of each ink for evaluation according to an indoor ozone resistance test method of JEITA CP-3901. In this test method, the temperature is set at 23° C.±2° C., the relative humidity is set at 50%±5% RH, and the ozone concentration is set at 1 to 5 ppm. The integral ozone concentration (ppm·hr) is determined by the expression of a set ozone concentration (ppm)× time (hr), and the image is exposed to ozone till the integral ozone concentration reaches an integral ozone concentration which is specified in the above-described test method (800 ppm·hr or 1,000 ppm·hr). In the present invention, the ozone resistance test can be conducted on appropriate test conditions that the temperature is 23° C. and the humidity is 50% RH, which are close to the general indoor environment.

Xenon Light Resistance Test

The xenon light resistance test for determining the performance of the dye contained in each ink constituting the ink set according to the present invention is conducted with the use of each ink for evaluation according to an indoor xenon light resistance test method of JEITA CP-3901. In this test method, the air temperature in the tank is set at 20° C.±5° C., the humidity is set at 50%±5% RH, the temperature of a black panel is set at 40° C. or less, a xenon arc type lamp is used as xenon light source, and the illumination of the light source is set at to 100 klx. The integral irradiance (klx·hr) is determined by the expression of set xenon light illumination (klx)×time (hr), and xenon light is irradiated till the integral irradiance reaches an integral irradiance (43,800 klx·hr or 65,700 klx·hr) which is specified in the above-described test method. In the present invention, the xenon light resistance test can be conducted on appropriate test conditions that the illumination is 50 klx and the temperature is 23° C. on a black panel, which is close to the general indoor temperature. In the present invention, a particularly appropriate test condition can be conditions in which the above-described conditions of the illumination and the temperature of the black panel are satisfied, further the air temperature in the tank is set at 23° C. and the humidity is set at 50% RH. In addition, the test is conducted on the condition in which a standard window glass filter (soda-lime glass with the thickness of 2 mm) is provided between the light source and the sample (image sample), and the sample is placed so as not to be brought in contact with the standard window glass filter, a gap of 5 mm or more is provided between the standard window glass filter and the sample, and the air passes through the gap. In order to reproduce conditions closer to the spectral distribution of the indoor light through the window glass, it is possible to use at least one of a UV-blocking filter and an infrared-blocking filter in addition to the standard window glass filter.

Recording Medium Used for Each Test

The optical density retention to be used for specifying characteristics of the ink set in the present invention is a value which is determined by a dye and a recording medium, but when a general recording medium for ink jet is used, the optical density retention is a value which is almost determined by the characteristics of the dye. When the dye to be used for each ink constituting the ink set of the present invention is selected, the above-described value of the optical density retention is used, which has been calculated from test results of the image formed by using each ink for evaluation. The value of the optical density retention is defined by a value which expresses a ratio of the optical densities of a certain image before and after the test by a unit of percentage, and accordingly when a so-called glossy paper is used, it can be considered that it does not often occur that the value greatly varies according to the type of the recording medium. However, in order to more accurately select dyes to be used for each ink constituting the ink set in the present invention, a recording medium can be used which has a glossy surface and has a porous layer provided therein, when the above-described ozone resistance test and the xenon light resistance test are conducted. Such a recording medium is a medium of which the porous layer adsorbs the dye, and the porous layer can include a cationic component such as alumina, its hydrate and a mixture of silica and a cationic polymer. The pH of the surface of the recording medium is preferably 3.0 or more and 8.0 or less, and further preferably 4.0 or more and 6.0 or less. A commercial recording medium having these characteristics includes a Canon photographic paper-glossy pro (platinum grade) and a Canon photographic paper-glossy gold (both being trade name of product made by Canon Inc.), which can be used in the present invention in particular.

Selection of Dye

The state of an image before and after the above-described ozone resistance test and the xenon light resistance test is evaluated by the value of the optical density retention, and the selection of dyes is a dominant factor for satisfying the value of the optical density retention in the present invention. Particularly, when the optical density retention is aimed at being 70% or more, it is extremely important to select an appropriate dye.

In the present invention, when the dye to be contained in each ink is selected, a cyan ink for evaluation, a magenta ink for evaluation and a yellow ink for evaluation which have certain respective compositions are prepared, and each of the inks for evaluation is used. This ink for evaluation is an ink which is considered so as to satisfy ink jet characteristics such as viscosity, surface tension and pH, and has an ink composition which can be stably ejected regardless of an ejection method.

The composition of the ink for evaluation is as follows.

Dye: predetermined amount (%)
Glycerin: 7.0%
Ethylene urea: 7.0%
1,5-pentanediol: 7.0%
2-pyrrolidone: 5.0%
Acetylenol E100 (surfactant made by Kawaken Fine Chemicals Co., Ltd.): 0.6%
Pure water: balance (%) for making the total of the ink composition 100.0%

By evaluating the optical density retention while using the ink for evaluation having such a composition, the dye can be selected under conditions where the influence of a component such as a water-soluble organic solvent and a surfactant other than the dye on the optical density retention is eliminated. In other words, it is secured by a combination of selected dyes that the ozone resistance and xenon light resistance of a high level are attained, and that the deterioration behaviors due to ozone and xenon light are balanced. Accordingly, the advantage of the present invention is also considered that the flexibility of the ink composition is high when the image characteristics other than the ozone resistance and the xenon light resistance are enhanced by the component other than the dye. On the other hand, a conventional ink set is evaluated as an ink, and accordingly the level of the image storage stability is often enhanced by an additive or the like other than the dye. In such a case, the flexibility of the ink composition becomes relatively low.

As is clear from the above-described technical significance, the present invention has also an aspect as a method of selecting a combination of dyes for being used in the ink set in which the ozone resistance and xenon light resistance of a high level are attained and the deterioration behaviors due to the ozone and the xenon light are balanced. In other words, the aspect is also a method of selecting the combination of the dye to be used in each of the inks, for the ink set including a cyan ink containing a cyan dye, a magenta ink containing a magenta dye and a yellow ink containing a yellow dye, according to the following steps. Such a method includes: preparing a cyan ink for evaluation containing the above-described cyan dye, a magenta ink for evaluation containing the above-described magenta dye and a yellow ink for evalu ation containing the above-described yellow dye; forming images with the use of the inks for evaluation; calculating the optical density retentions of the images formed in the previous step before and after an ozone resistance test and before and after a xenon light resistance test under a predetermined condition, respectively; and selecting a combination of the cyan dye, the magenta dye and the yellow dye from the optical density retentions as measured in the previous step so as to satisfy a predetermined condition.

A dye which can satisfy the characteristics of the ink set of the present invention described above is selected as a dye to be contained in each of the inks constituting the ink set of the present invention. Specifically, as long as the dyes are selected which attain the ozone resistance and xenon light resistance of a high level, and can decrease the distribution of these characteristics among the inks as much as possible, any dye out of well known dyes and newly synthesized dyes for the present invention can be used. Each ink can contain one or more types of dyes. The content (% by mass) of the dye in each ink can be 0.1% by mass or more and 10.0% by mass or less with reference to the total mass of the ink. When two or more types of dyes are used for one ink, the value of the content of the dyes shall mean the content of the total.

Type of Dye

As described above, the dye is selected which can satisfy the characteristics of the ink set of the present invention, which were described above, and is contained in each ink constituting the ink set of the present invention. In other words, dyes which are resistant to causing degradation and denaturation due to ozone gas or xenon light, in other words, be superior in ozone resistance and xenon light resistance are used for respective dyes to be contained in each ink, and the dyes are selected so that the characteristics of the ozone resistance and the xenon light resistance of each dye are equal. Furthermore, in the present invention, respective dyes can be used which can attain color tones and optical densities suitable for the inks of each hue of cyan, magenta and yellow. Specific examples of a dye will be described below which can be contained in each ink constituting the ink set of the present invention. Of course, it is clear that the present invention is not limited to the dyes which will be described below, because it is important in the invention to satisfy the requirements for the ink set of the present invention, which were described above.

Cyan Dye

Dye represented by the following General Formula (1) (dye described in WO 2007/091631)

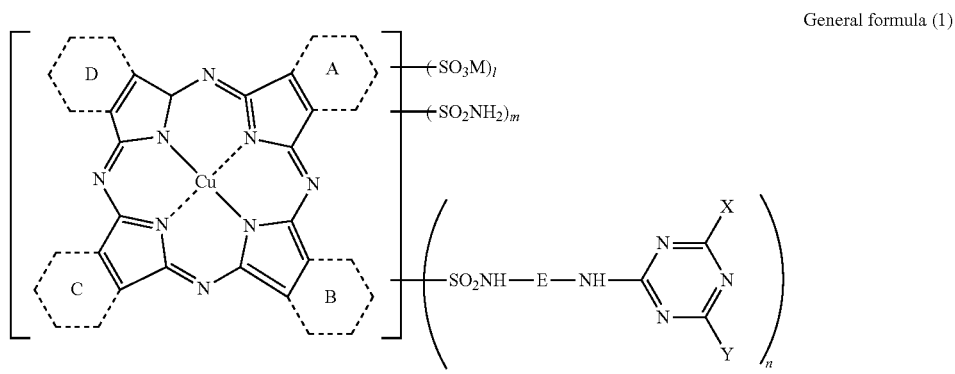

General formula (1)

(wherein A, B, C and D each independently represent a six-membered ring having aromaticity; M each independently represents one of a hydrogen atom, an alkaline metal, ammonium and an organic ammonium; E represents an alkylene group; X is one of a sulfo-substituted anilino group, a carboxyl-substituted anilino group and a phosphono-substituted anilino group, and the respective substituted anilino groups may have 1 to 4 substituents of at least one substituent selected from the group consisting of a sulfonic group, a carboxyl group, a phosphono group, a sulfamoyl group, a carbamoyl group, a hydroxyl group, an alkoxy group, an amino group, an alkylamino group, dialkylamino group, an arylamino group, a diaryl amino group, an acetyl amino group, an ureido group, an alkyl group, a nitro group, a cyano group, halogen, an alkylsulfonyl group and an alkylthio group; Y represents one of a hydroxyl group and an amino group; and l, m, and n represent values which satisfy $0 \leq l \leq 2.0$, $0 \leq m \leq 3.0$ and $0.1 \leq n \leq 3.0$, respectively, and satisfy l+m+n=1.0 to 4.0.)

In the present invention, at least one group among A to D in the General Formula (1) is preferably one of a pyridine ring and a pyrazine ring in order to obtain an image superior in ozone resistance and xenon light resistance. In addition, in the General Formula (1), E is preferably an alkylene group having 2 to 6 carbon atoms, X is preferably a sulfo-substituted anilino group, and Y is preferably an amino group. Furthermore, it is preferable that l=0, m=0.5 to 3.0 and n=0.1 to 1.0.

Specific examples of the dye represented by the General Formula (1) include the following exemplified compounds C1 to C6, which are shown in a form of a free acid. In addition, in the following exemplified compounds 1 to 6, positions of nitrogen-containing aromatic rings are not limited to those shown in each structural formula, but mean to be any position in A to D of the above-described General Formula (1). The position of the nitrogen atom in the nitrogen-containing aromatic ring is also not limited to the position shown in each structural formula. In addition, each value of l, m and n in each exemplified compound 1 to 6 represents the average value in the mixture.

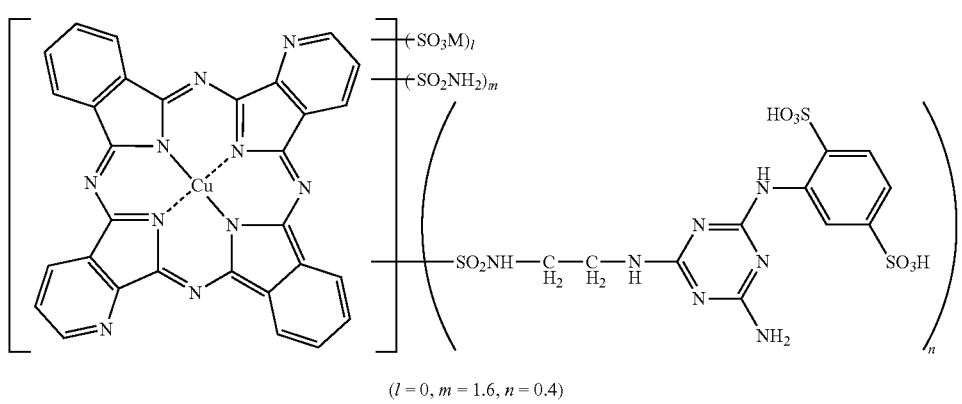
Exemplified compound C1
($l = 0, m = 1.6, n = 0.4$)
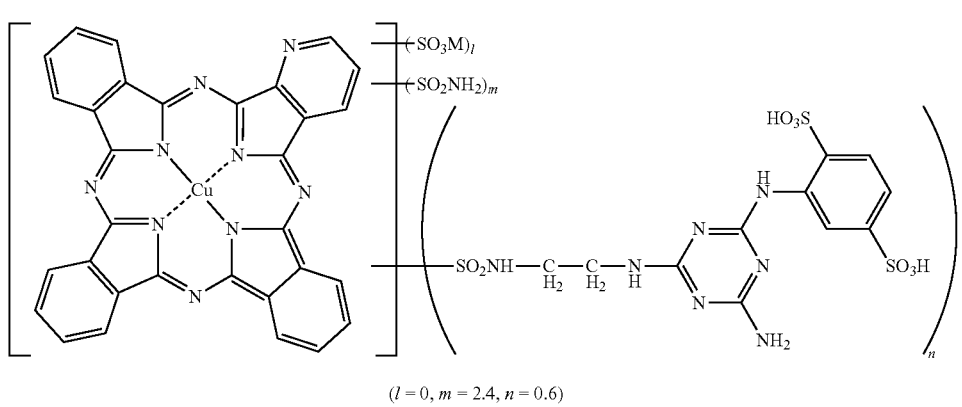
Exemplified compound C2
($l = 0, m = 2.4, n = 0.6$)
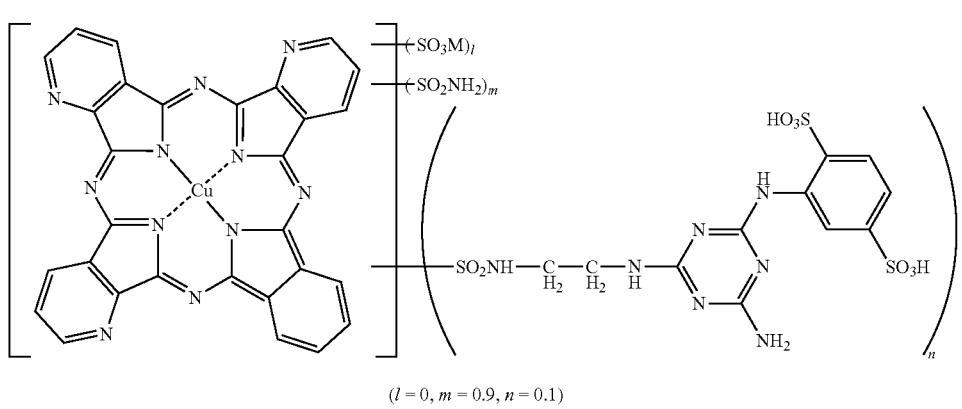
Exemplified compound C3
($l = 0, m = 0.9, n = 0.1$)
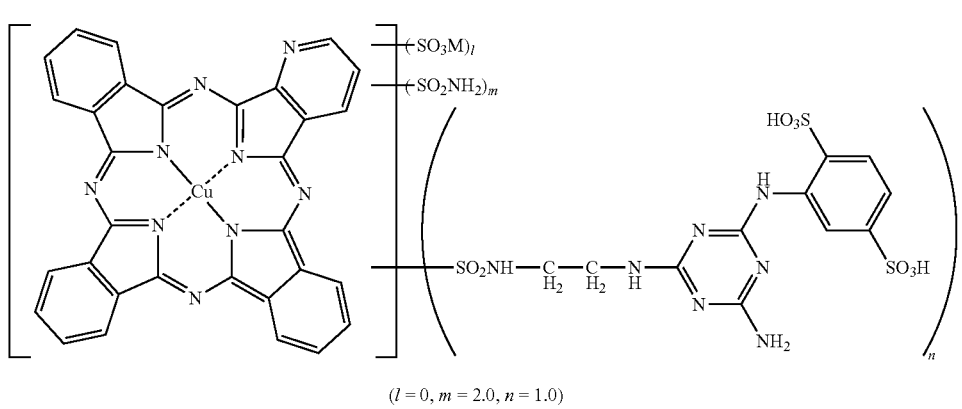
Exemplified compound C4
($l = 0, m = 2.0, n = 1.0$)

Exemplified compound C5

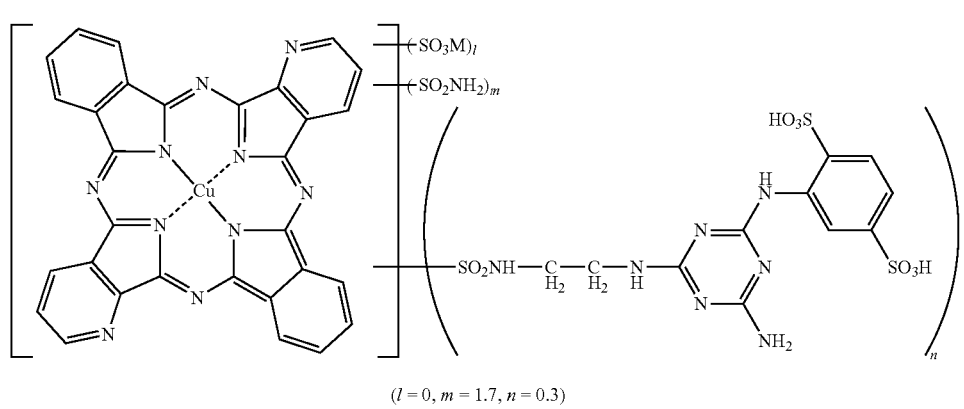

($l = 0, m = 1.7, n = 0.3$)

Exemplified compound C6

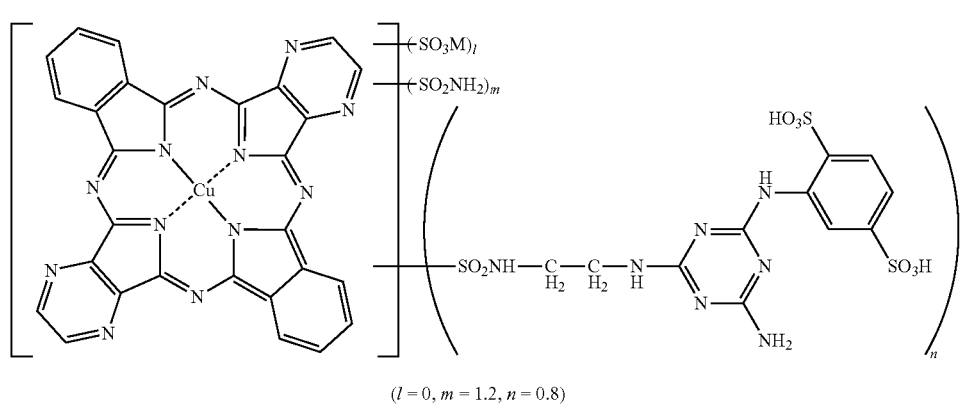

($l = 0, m = 1.2, n = 0.8$)

Dye represented by the following General Formula (2) (Japanese Patent No. 3851569)

General formula (2)

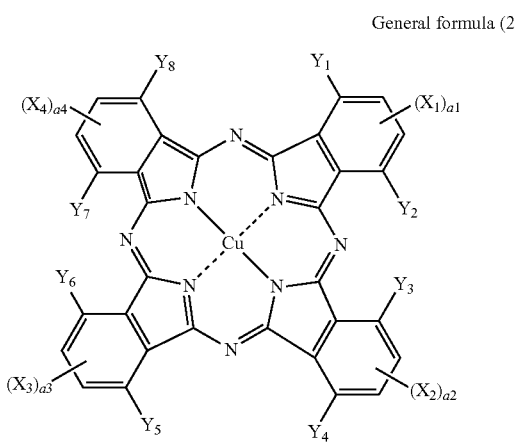

(wherein $X_1, X_2, X_3$ and $X_4$ each independently represent one of —SO—Z, —SO$_2$—Z, —SO$_2$NR$_1$R$_2$, a sulfonic group, —CONR$_1$R$_2$ and —CO$_2$R$_1$, wherein Z each independently represents one of a substituted or unsubstituted alkyl group, a substituted or unsubstituted cycloalkyl group, a substituted or unsubstituted alkenyl group, a substituted or unsubstituted aralkyl group, a substituted or unsubstituted aryl group and a substituted or unsubstituted heterocyclic group, and $R_1$ and $R_2$ each independently represent one of a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group and a substituted or unsubstituted heterocyclic group; $Y_1, Y_2, Y_3, Y_4, Y_5, Y_6, Y_7$ and $Y_8$ each independently represent one of a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group and a sulfonic group; and $a_1, a_2, a_3$ and $a_4$ each independently represent the number of the substituents of $X_1, X_2, X_3$ and $X_4$, and are each independently an integer of one of 1 and 2.)

In the present invention, $X_1, X_2, X_3$ and $X_4$ in the General Formula (2) are preferably each independently one of —SO—Z, —SO$_2$—Z, —SO$_2$NR$_1$R$_2$, —CONR$_1$R$_2$ and —CO$_2$R$_1$; and $Y_1, Y_2, Y_3, Y_4, Y_5, Y_6, Y_7$ and $Y_8$ are preferably a hydrogen atom. An image superior in ozone resistance and xenon light resistance can be obtained by using such substituents.

Specific examples of the structure represented by the General Formula (2) include the following exemplified compound C7, which is shown in a form of a free acid.

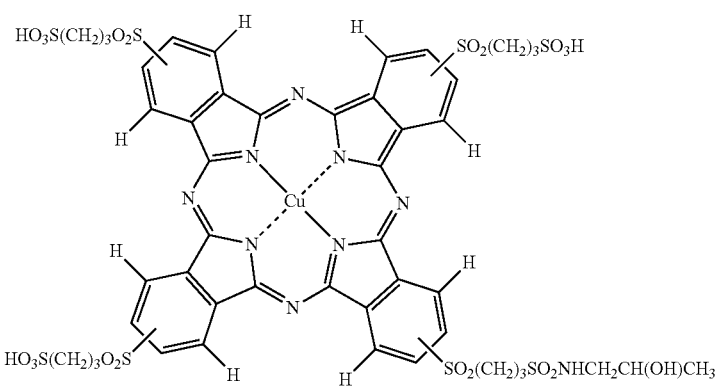

Exemplified compound C7

Magenta Dye
Dye represented by the following General Formula (3) (dye described in WO 2008/062662)

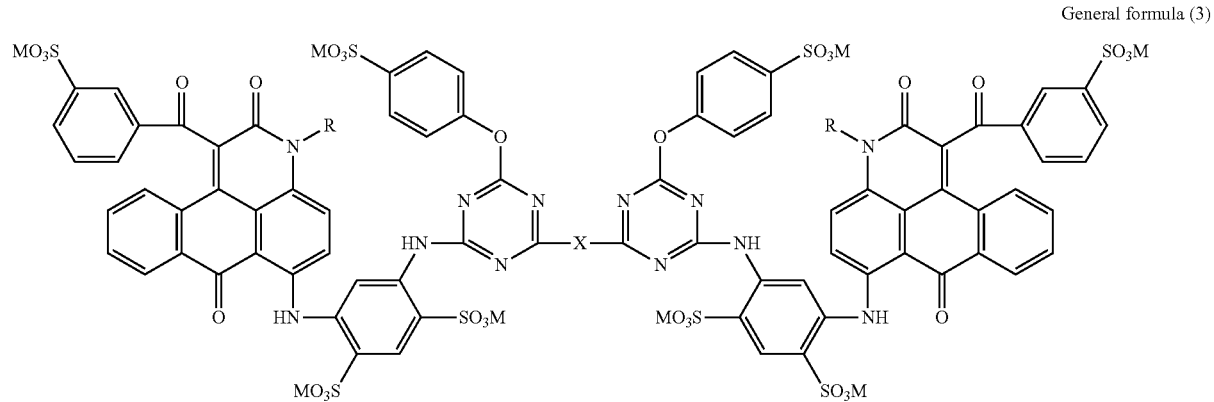

General formula (3)

(wherein R each independently represents one of a hydrogen atom, an alkyl group, a hydroxyalkyl group, a cyclohexyl group, a monoalkyl aminoalkyl group and a dialkyl aminoalkyl group; M each independently represents one of a hydrogen atom, an alkaline metal, ammonium and an organic ammonium; and X represents a linking group.)

Specific examples of the dye represented by the General Formula (3) include the following exemplified compound M1, which is shown in a form of a free acid.

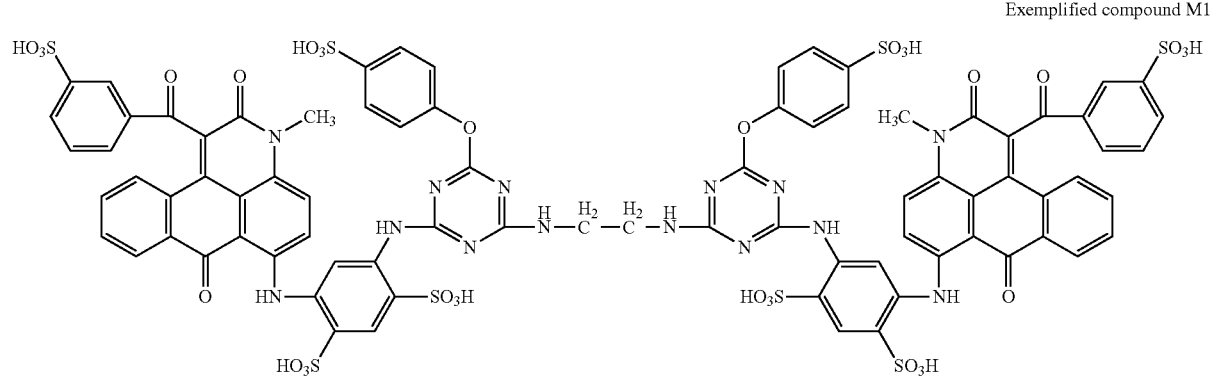

Exemplified compound M1

Dye represented by the following General Formula (4) (dye described in Japanese Patent Application Laid-Open No. 2006-143989)

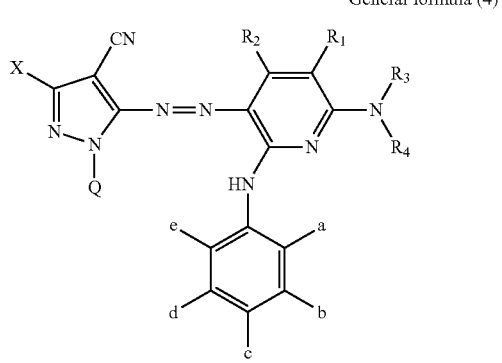

General formula (4)

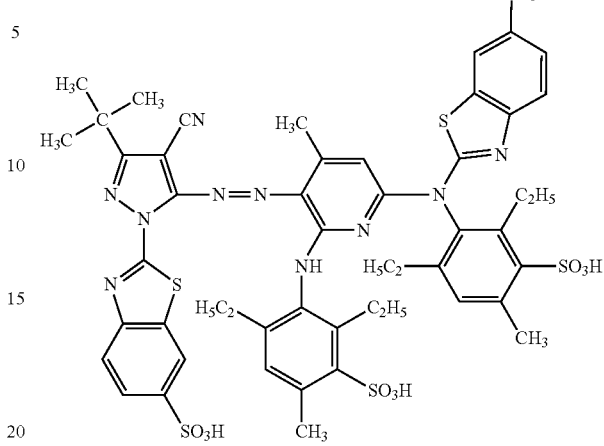

Exemplified compound M2

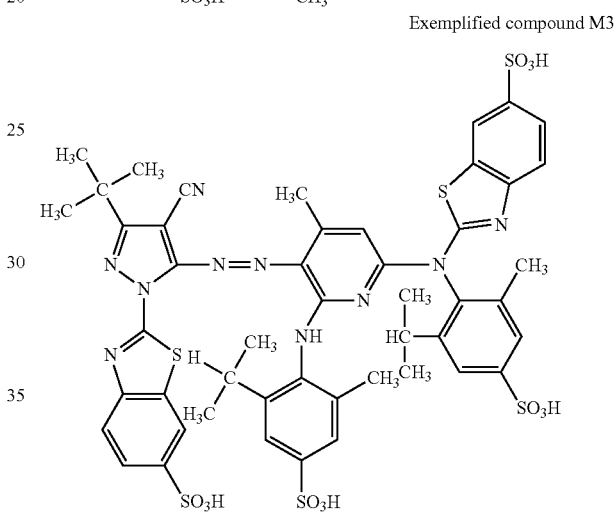

Exemplified compound M3

(wherein X represents one of a hydrogen atom, an aliphatic group, an aromatic group and a heterocyclic group; $R_1$ and $R_2$ each independently represent one of a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyl oxy group, an acyloxy group, a carbamoyl oxy group, a heterocyclic oxy group, an alkoxycarbonyl oxy group, an aryloxycarbonyl oxy group, an alkylamino group, an arylamino group, a heterocyclic amino group, an acylamino group, an ureido group, a sulfamoyl amino group, an alkoxycarbonyl amino group, an aryloxycarbonyl amino group, an alkylsulfonyl amino group, an aryl sulfonyl amino group, an aryloxycarbonyl amino group, a nitro group, an alkylthio group, an arylthio group, an alkylsulfonyl group, an arylsulfonyl group, an alkylsulfinyl group, an arylsulfinyl group, a sulfamoyl group, a sulfonic group and a heterocyclic thio group, and each of these groups may further have a substituent; $R_3$ and $R_4$ each independently represent one of a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group and sulfamoyl group, and each of these groups may further have a substituent; $R_1$ and $R_3$ or $R_3$ and $R_4$ may also be bonded to each other to form one of a five-membered and a six-membered ring; 'a' and 'e' each independently represent one of an alkyl group, an alkoxy group and a halogen atom, wherein when both 'a' and 'e' are alkyl groups, the total number of carbon atoms constituting the alkyl group is 3 or more and the alkyl groups may further have a substituent; 'b', 'c' and 'd' each independently represent a substituent selected from the group consisting of the substituents listed for $R_1$ and $R_2$, and 'a' and 'b' or 'e' and 'd' may be ring-fused with each other; Q represents one of a hydrogen atom, an aliphatic group, an aromatic group and a heterocyclic group, and each of these groups may further have a substituent; wherein at least one ionic group is present in the General Formula (4).)

Specific examples of the dye represented by the General Formula (4) include the following exemplified compounds M2 and M3, which are shown in a form of a free acid.

Yellow Dye
Dye represented by the following General Formula (5) (dye described in WO 2006/082669)

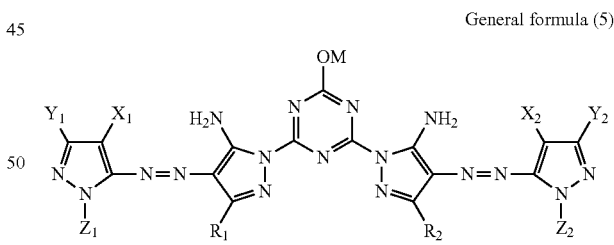

General formula (5)

(wherein $R_1$, $R_2$, $Y_1$ and $Y_2$ are each independently a monovalent group; $X_1$ and $X_2$ are each independently an electron-attracting group having a Hammett σp value of 0.20 or more; $Z_1$ and $Z_2$ each independently represent one of a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group; and M represents one of a hydrogen atom, an alkaline metal, ammonium and an organic ammonium.)

The electron-attracting group having the Hammett σp value of 0.20 or more specifically includes one of an acyl group, an acyloxy group, a carbamoyl group, an alkyloxycarbonyl group, an aryloxycarbonyl group, a cyano group, a nitro group, a dialkyl phosphono group, a diaryl phosphono group, a diaryl phosphinyl group, an alkylsulfinyl group, an arylsulfinyl group, an alkylsulfonyl group, an arylsulfonyl group, a sulfonyl oxy group, an acyl thio group, a sulfamoyl group, a thiocyanate group, a thiocarbonyl group, an alkyl halide group, an alkoxy halide group, an aryloxy halide group, an alkylamino halide group, and an alkylthio halide group, as well as an aryl group, a heterocyclic group, a halogen atom, an azo group and a selenocyanate group which are substituted with another electron-attracting group having a σp value of 0.20 or more.

Specific examples of the dye represented by the General Formula (5) include the following exemplified compounds Y1 to Y10, which are shown in a form of a free acid.

Exemplifed compound Y1

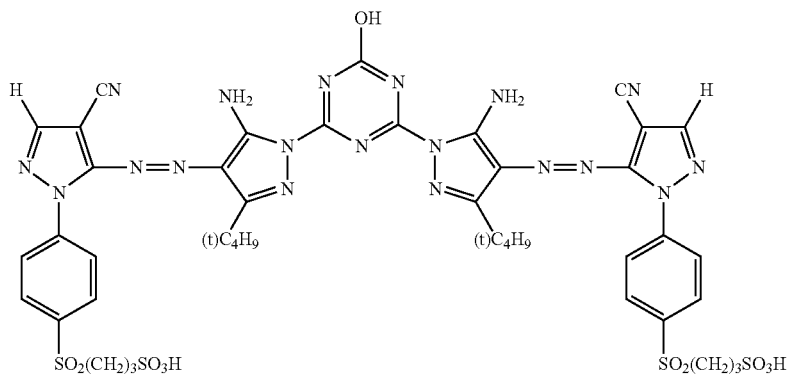

Exemplifed compound Y2

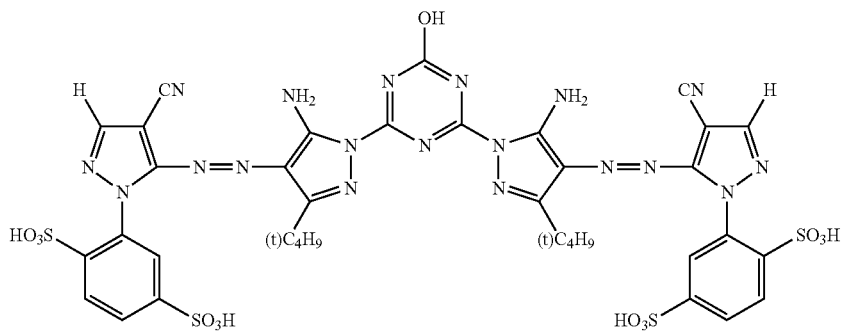

Exemplifed compound Y3

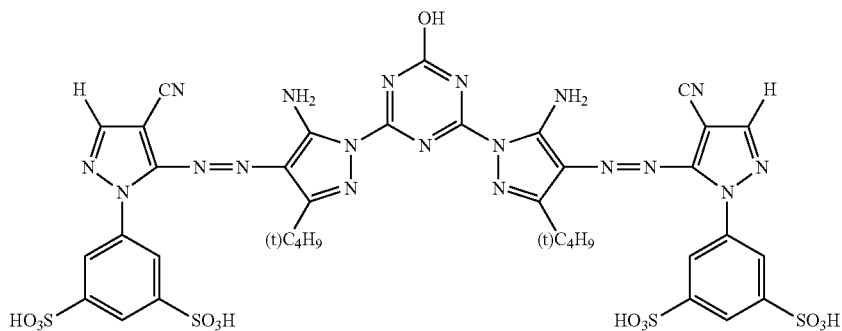

Exemplifed compound Y4

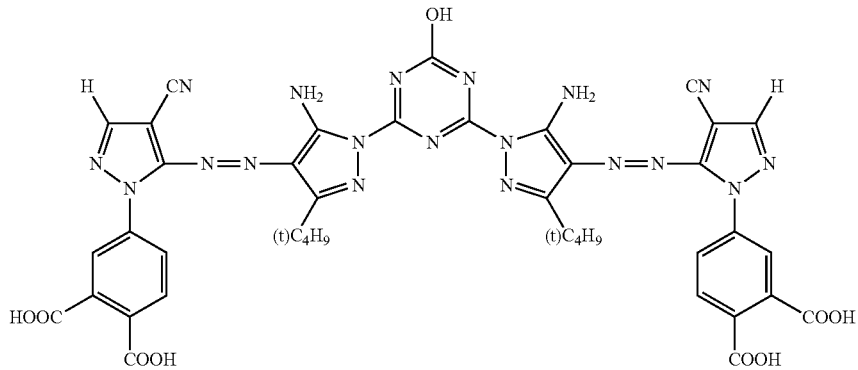

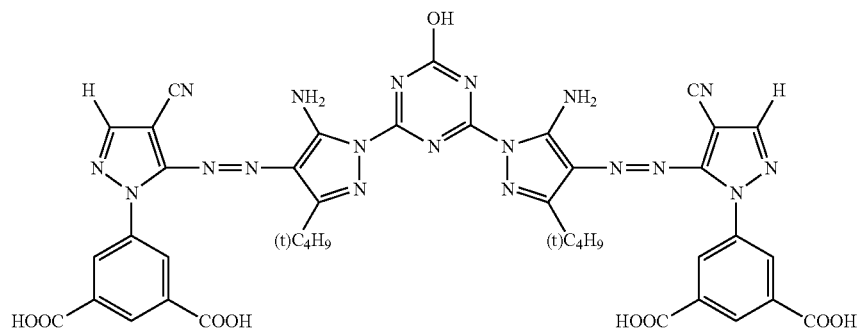
Exemplified compound Y5
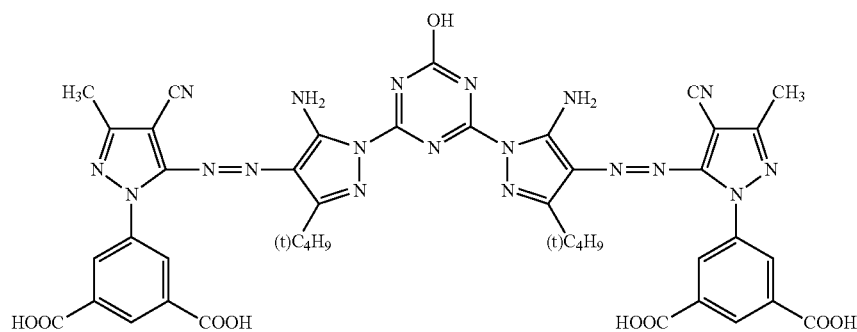
Exemplified compound Y6
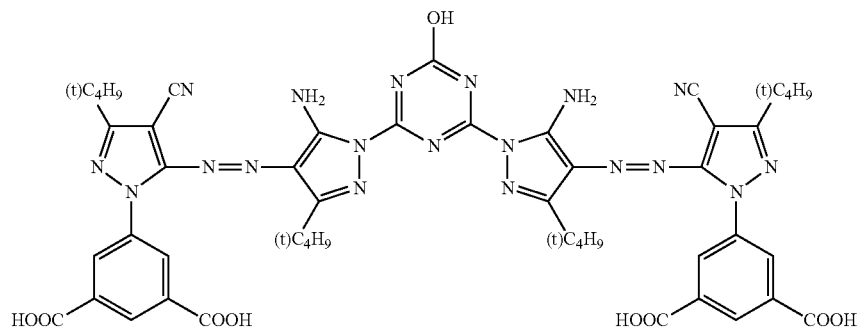
Exemplified compound Y7
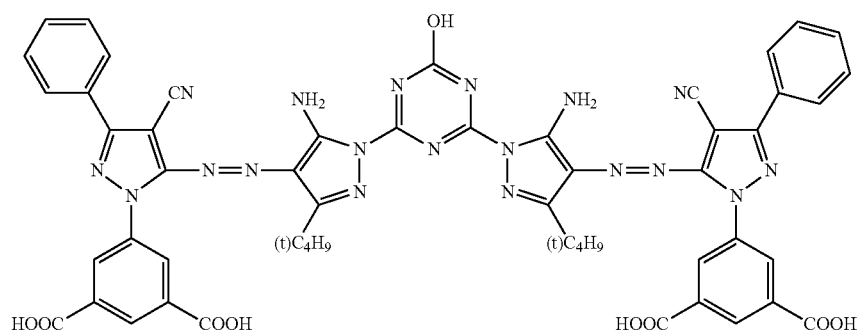
Exemplified compound Y8

Exemplified compound Y9

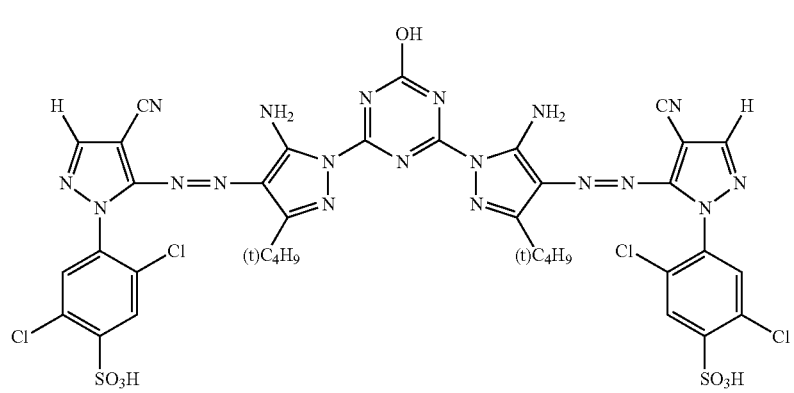

Exemplified compound Y10

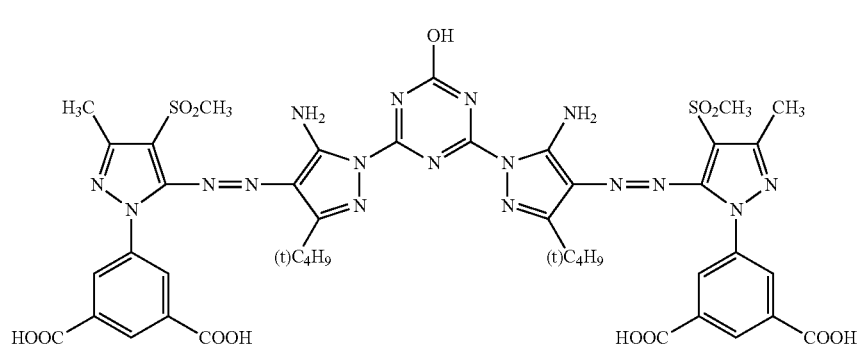

Dye represented by the following General Formula (6) (dye described in WO 2008/053776)

General formula (6)

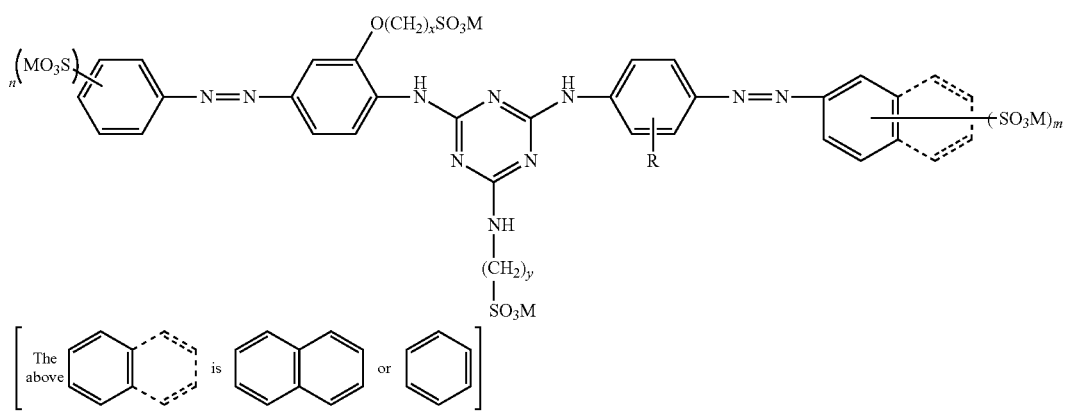

(wherein R represents one of a hydrogen atom, an alkyl group having 1 to 4-carbon atoms, an alkoxy group having 1 to 4 carbon atoms and a sulfonic group; n is an integer of 1 or 2; m is an integer of 1 to 3; x is an integer of 2 to 4; y is an integer of 1 to 3; and M each independently represents one of a hydrogen atom, an alkaline metal, ammonium and an organic ammonium.)

Specific examples of the dye represented by the General Formula (6) include the following exemplified compounds Y11 to Y17, which are shown in a form of a free acid.

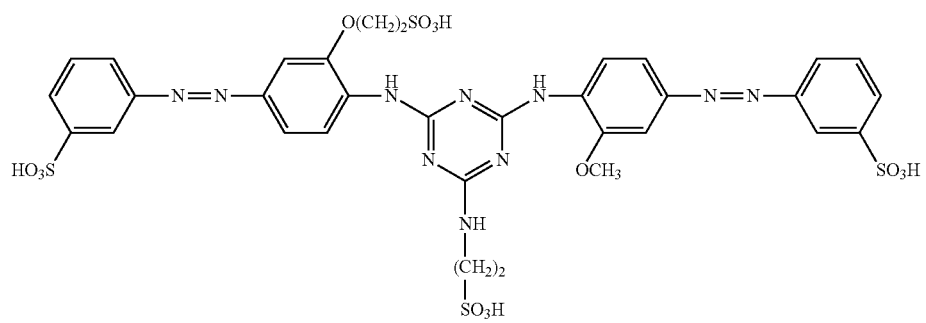
Exemplified compound Y11
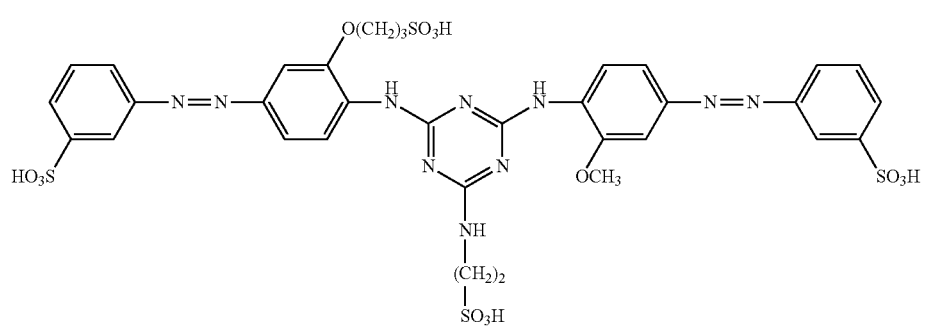
Exemplified compound Y12
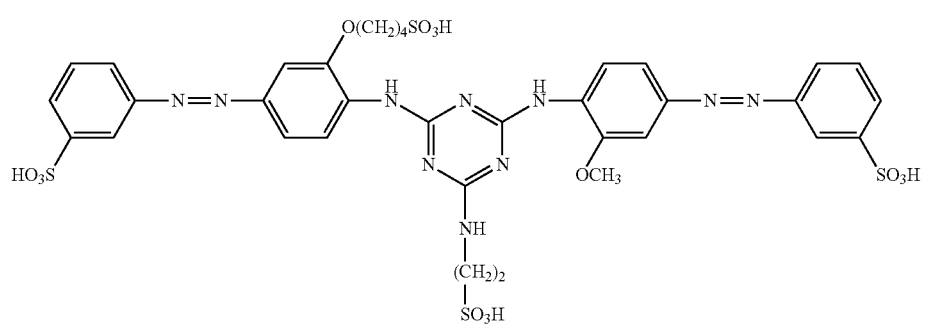
Exemplified compound Y13
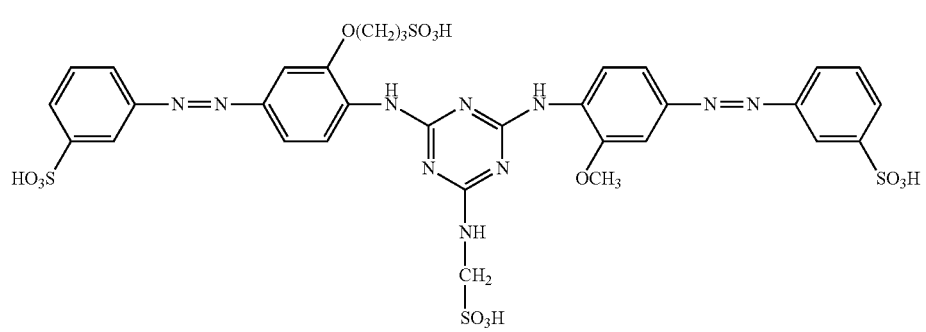
Exemplified compound Y14
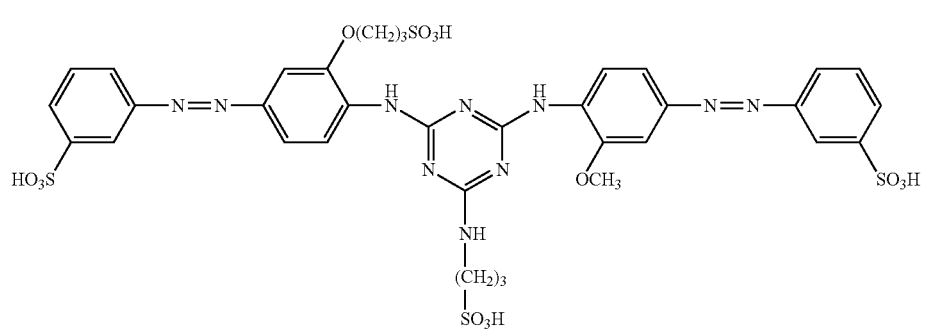
Exemplified compound Y15

-continued

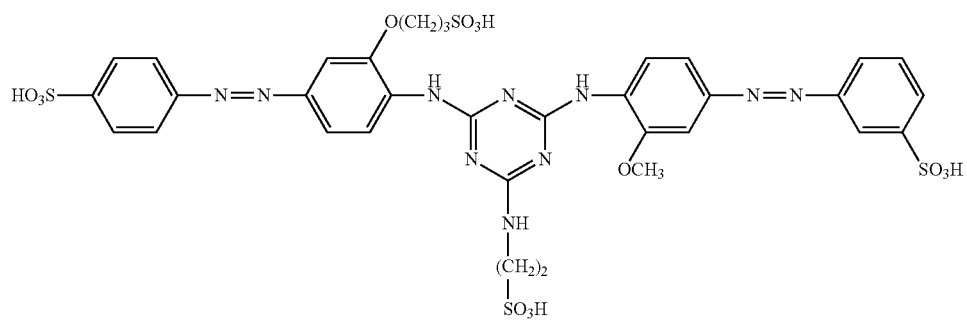

Exemplified compound Y16

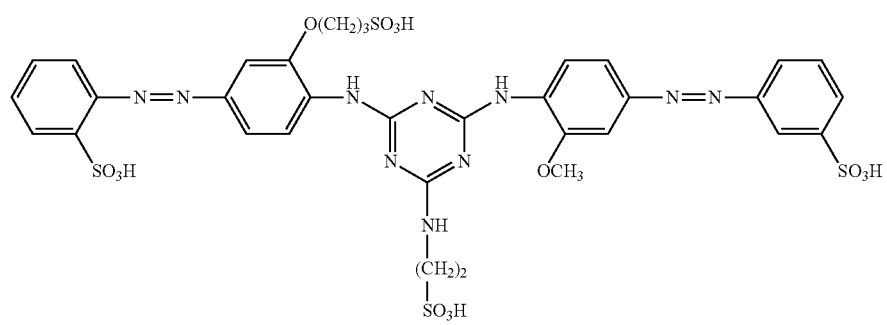

Exemplified compound Y17

An image formed by a yellow ink shows a higher lightness than that formed by a cyan ink or a magenta ink. When the color fading of the image formed by the yellow ink proceeds to raise the lightness, a difference in lightness between the image formed by the yellow ink and the image formed by each of the cyan ink and the magenta ink increases, which often gives such an impression that the image has been deteriorated. For this reason, in the present invention, it is particularly preferable to select dyes so that the optical density retention of the image formed by the yellow ink is higher than the optical density retentions of the images formed by the cyan ink and the magenta ink to allow them to be contained in the inks.

Aqueous Medium

In the present invention, in order to determine the combination of dyes to be contained in each ink constituting an ink set, tests for ozone resistance and xenon light resistance are conducted by using the above-described ink for evaluation. When the dyes selected through these tests are used, the composition of the aqueous medium to be used for each ink constituting the ink set can be appropriately determined according to the characteristics of each dye and an ejection method. Specifically, the actual composition of each ink constituting the ink set does not need to be set at the same composition as the above-described ink for evaluation, and each of the cyan, magenta and yellow inks may have the same composition as the others or a different composition from that of the others.

An aqueous medium which is a mixture solvent of water and a water-soluble organic solvent can be used for each ink constituting the ink set of the present invention. Deionized water (ion-exchanged water) can be used for the water. The content (% by mass) of water in the ink can be set at 10.0% by mass or more and 90.0% by mass or less with reference to the total mass of the ink. In addition, the content (% by mass) of the water-soluble organic solvent in the ink can be 3.0% by mass or more and 50.0% by mass or less with reference to the total mass of the ink, and can further be 15.0% by mass or more and 40.0% by mass or less. The water-soluble organic solvent is not limited in particular as long as the water-soluble organic solvent can be generally used in an ink for an ink jet, and can employ any conventionally well-known water-soluble organic solvent. The ink can also contain one or more types of water-soluble organic solvents in combination. Specifically, usable water-soluble organic solvents include monovalent or polyvalent alcohols, alkylene glycols of which the alkylene group has approximately 1 to 4 carbon atoms, polyethylene glycols with an average molecular weight of approximately 200 to 2,000, glycol ethers and nitrogen-containing compounds.

Poor Medium/Good Medium

In the present invention, each ink constituting the ink set preferably contains a water-soluble organic solvent that has a particular relationship with the solubility of the dye. A water-soluble organic solvent satisfying such a relationship is referred to as a poor medium or a good medium in the present invention, but the detail of specific examples will be described later. In the present invention, a dye which can achieve both ozone resistance and xenon light resistance at a high level is used in each of the ink. A dye satisfying such characteristics tends to have a large molecular weight compared to conventional dyes. A dye having a large molecular weight has a low proportion of chromophore groups in the molecule, and the ink needs to increase the content of the dye so as to show sufficient color developability, but it is disadvantageous for intermittent ejection stability and sticking resistance to increase the content. Specifically, when an image is formed with an ink jet recording method, if the ink has not been ejected for a certain period of continual time, water and the like in the ink evaporate from an ejection orifice of a recording head, and the ink occasionally is not ejected normally. In any of the case in which the intermittent ejection stability is low and the case in which the sticking resistance is low, such a phenomenon occurs that the ink is not normally ejected, and the causes of these phenomena are different depending on the case, and accordingly, the solving techniques are different.

Firstly, the cause of the lowering of the intermittent ejection stability and its solving technique will be described below. The cause by which the intermittent ejection stability of the ink is lowered includes such a situation that water and the like in the ink evaporate from the ejection orifice even when the ink is not ejected in a short period of time in a scanning process of the recording head, which consequently leads to the following states. As the water and the like in the ink evaporate from the ejection orifice, the concentration of the dye in the ink in the vicinity of the ejection orifice relatively increases, and on the other hand, in a portion farther from the ejection orifice in the inner part of the nozzle, the concentration of the dye in the ink relatively decreases. Then, the concentration distribution of the dye occurs between the vicinity of the ejection orifice and the inner part of the nozzle. At this time point, the concentration of a water-soluble organic solvent relatively increases in the vicinity of the ejection orifice due to the evaporation of the water and the like, the solubility of the dye is lowered, and the dye precipitates or solidifies to block the ejection orifice. As a result, the ink cannot be normally ejected. Thus, the intermittent ejection stability is lowered.

The problem of the lowering of the intermittent ejection stability becomes conspicuous particularly when a dye superior in the ozone resistance and the light resistance has been used. With respect to the problem, the use of a poor medium (a water-soluble organic solvent for which the dye is less soluble) can reduce the lowering of the intermittent ejection stability, according to the following mechanism. As described above, by the evaporation of the water and the like, the concentrations of the dye and the water-soluble organic solvent in the vicinity of the ejection orifice each increase. Here, when the ink contains a poor medium among water-soluble organic solvents, the dye is considered to quickly diffuse into the inner part of the nozzle away from the ejection orifice so as to keep the solubility, in the vicinity of the ejection orifice having a high concentration of the poor medium. In other words, the use of the poor medium can make the dye diffuse into the inner part of the nozzle, before the solubility of the dye decreases. As a result, it is suppressed for the dye to increase its concentration to such a level of that precipitation or solidification occurs in the vicinity of the ejection orifice, no-ejection of the ink does not occur, and the intermittent ejection stability is enhanced.

Next, the cause of the lowering of the sticking resistance and its solving technique will be described below. The cause by which the sticking resistance of the ink is lowered includes such a situation that the water and the like in the ink evaporate from the ejection orifice when the ink has not been ejected for a long period of continual time, which consequently leads to the following states. When the water and the like in the ink evaporate from the ejection orifice, the dye precipitates or solidifies to block the ejection orifice. As a result, the ink cannot be normally ejected. Thus, sticking resistance is lowered. Unlike the case of the above-described intermittent ejection stability, the lowering of the sticking resistance occurs based on the occurrence of the precipitation or the solidification of the dye not only in the vicinity of the ejection orifice but also in the inner part or the bottom part of the nozzle, because the state in which the ink is not ejected continues for a long period of time.

The problem of the lowering of the sticking resistance becomes conspicuous particularly when a dye superior in the ozone resistance and the light resistance has been used. With respect to the problem, the use of a good medium (a water-soluble organic solvent for which the dye is more soluble) can reduce the lowering of the sticking resistance. In other words, the use of the good medium suppresses the precipitation and the solidification of the dye, hardly causes no-ejection of the ink, and enhances the sticking resistance. Concerning the suppression of the lowering of the sticking resistance, a positive effect cannot be obtained even though the above-described poor medium has been used.

It is determined by the solubility of the dye whether a certain water-soluble organic solvent is a good medium or a poor medium with respect to a dye to be used together. In other words, the good medium and the poor medium are indexes which indicate the relationship between the water-soluble organic solvent and the dye from the viewpoint of the solubility. In the present invention, a water-soluble organic solvent in which the solubility of the dye is 5% by mass or less is defined as a water-soluble organic solvent that acts as a poor medium, and a water-soluble organic solvent in which the solubility of the dye exceeds 5% by mass is defined as a water-soluble organic solvent that acts as a good medium.

More specifically, it can be determined in the following way whether a certain water-soluble organic solvent is a good medium or a poor medium with respect to a dye being an object to be determined. The water-soluble organic solvent of an object to be determined and a sufficient amount of a dye are placed into a sample bottle having a capacity of approximately 20 cc, and the liquid is stirred overnight. This liquid is centrifuged for 10 minutes at 12,000 rpm, and the dye which does not dissolve in the liquid is settled. Because the supernatant liquid after the centrifugal separation is a saturated solution of the dye, the solubility of the dye can be determined by measuring the absorbance of the liquid, and calculating the ratio of the measured absorbance to the absorbance of an aqueous solution of the dye with a known concentration. It can be determined that the water-soluble organic solvent having the solubility calculated in this way of 5% by mass or less is the poor medium, and the water-soluble organic solvent having the solubility of more than 5% by mass is the good medium. In addition, when a water-soluble organic solvent is solid at room temperature, it can be determined whether the water soluble organic compound is a poor medium or a good medium with respect to the dye, by confirming whether the solubility of the dye in a 20% by mass aqueous solution of the water-soluble organic solvent is 5% by mass or less or not, in a similar method to the above-described method.

When an ink contains excessively little poor medium, the effect of suppressing the lowering of the intermittent ejection stability occasionally cannot be sufficiently obtained, and when an ink contains excessively much poor medium, the sticking resistance is occasionally lowered on the contrary. Accordingly, the content (% by mass) of the poor medium in the ink is preferably 1.0% by mass or more and 15.0% by mass or less with reference to the total mass of the ink, and further preferably 3.0% by mass or more and 10.0% by mass or less. When an ink contains excessively little good medium, the effect of suppressing the lowering of the sticking resistance occasionally cannot be sufficiently obtained, and when an ink contains excessively much good medium, the viscosity of the ink becomes high and the ejection stability occasionally cannot be sufficiently obtained. Accordingly, the content (% by mass) of the good medium in the ink is preferably 10.0% by mass or more and 35.0% by mass or less with reference to the total mass of the ink, and further preferably 15.0% by mass or more and 30.0% by mass or less. Furthermore, in order to achieve both the intermittent ejection stability and the sticking resistance at a high level, the content of the poor medium in the ink is preferably, in terms of mass ratio of the content of the poor medium to the content of the good medium, 0.1 times or more and 0.9 times or less. In addition, when a plurality of dyes are contained in the ink, it is possible to determine whether the water-soluble organic solvent of the dye having the largest content is a good medium or a poor medium to thereby make adjustment so as to satisfy the above-described range of the content of the poor medium and the good medium, and the range of the mass ratio.

In the present invention, an ink can contain at least the following poor medium and the good medium. The poor medium includes an alkane diol such as 2-methyl-1,3-propanediol, 1,5-pentanediol, 3-methyl-1,5-pentanediol, 1,2-hexanediol and 1,6-hexanediol. In addition, the good medium includes bis(2-hydroxyethyl)sulfone, 2-pyrrolidone, 1-(2-hydroxyethyl)-2-pyrrolidinone, ethylene glycol, diethylene glycol, triethylene glycol, tetraethylene glycol, propylene glycol, diethylene glycol monobutyl ether, triethylene glycol monobutyl ether, trimethylolpropane, glycerin, urea and ethylene urea. Of course, the water-soluble organic solvent is not limited to the above-described specific examples of the water soluble organic solvent, because it depends on the type and the structure of the dye whether a certain water-soluble organic solvent is the poor medium or the good medium.

Other Additives

Each ink constituting the ink set of the present invention may also contain a water-soluble organic compound which is solid at room temperature, including polyhydric alcohols such as trimethylolpropane and trimethylolethane, urea derivatives such as urea and ethylene urea, and sugars and a derivative thereof. Furthermore, each of the inks constituting the ink set of the present invention may also, contain various additives such as a surfactant, a pH moderator, an anti-rust agent, an antiseptic agent, a mildewproofing agent, an antioxidant, a reduction-preventing agent, an evaporation accelerator, a chelating agent and a water-soluble polymer, as needed. In the present invention, acetylene glycol surfactants are preferably used. Among them, an ethylene oxide adduct of acetylene glycol is particularly preferably used, because of superior solubility for aqueous mediums.

Physical Properties of Ink

The surface tension at 25° C. of each ink constituting the ink set of the present invention is preferably 20 mN/m or more and 60 mN/m or less. Each of the inks constituting the ink set of the present invention can effectively suppress the occurrence of dot misalignment (misalignment of landing point of ink) or the like, which occurs due to the wetting of the vicinity of the ejection orifice when the ink set has been applied to an ink jet system, by controlling the surface tension to the above-described range. The surface tension of the ink can be adjusted by appropriately determining the contents of the surfactant and the like in the ink. In addition, each ink constituting the ink set of the present invention is preferably controlled to have a desired pH so as to provide adequate ejection characteristics when the ink set is applied to an ink jet recording apparatus. The viscosity at 25° C. of each ink constituting the ink set of the present invention is preferably 1.0 mPa·s or more and 5.0 mPa·s or less.

Ink Cartridge

An ink cartridge of the present invention includes an ink storage portion for storing an ink therein, and the ink storage portion stores at least one ink selected from a cyan ink, a magenta ink and a yellow ink which constitute the above-described ink set of the present invention. In the present invention, three ink cartridges each storing any one of the inks may be combined together so as to correspond to the three types of inks constituting the ink set of the present invention, or one ink cartridge may store the above-described three types of inks.

The structure of the ink cartridge includes a structure having an ink storage portion which includes an ink storage chamber for storing a liquid ink therein, and a negative-pressure generation member storage chamber for storing a negative-pressure generation member which holds an ink in its inner part by the negative pressure. Alternatively, the ink cartridge may also be an ink cartridge having an ink storage portion which has such a structure as not to have the ink storage chamber for storing the liquid ink therein but hold the whole amount of ink to be stored therein with the negative-pressure generation member. Furthermore, the ink cartridge may also be an ink cartridge having a form which is structured so as to have the ink storage portion and the recording head.

Ink Jet Recording Method and Ink Jet Recording Apparatus

The ink jet recording method according to the present invention includes an image-forming step which forms an image on a recording medium by ejecting each of the above-described inks constituting the ink set of the present invention with a recording head of an ink jet system. In the image-forming step, a cyan ink, a magenta ink and a yellow ink, which constitute the above-described ink set of the present invention are used. The ink jet recording apparatus according to the present invention is an apparatus which includes an ink storage portion for storing an ink therein, and a recording head for ejecting the ink. The inks stored in the above-described ink storage portion are the cyan ink, the magenta ink and the yellow ink which constitute the above-described ink set of the present invention. The step and the structure of the ink jet recording method and the recording apparatus may be well-known ones, except that the ink set of the present invention is used.

In the above-described ozone resistance test and the xenon light resistance test, a recording medium having some characteristics is preferably used so that the dyes to be contained in each ink can be more accurately selected. When respective inks containing the dyes selected in this way are used, it hardly occurs that the balance between the ozone resistance and the xenon light resistance is largely deteriorated, even though the image is formed on any recording medium. Accordingly, the recording medium which uses each of the inks constituting the ink set of the present invention in order to form an image thereon can employ any recording medium which can be used for a general ink jet. Such a recording medium includes an ink jet recording medium having a porous layer on a support including, for instance, a glossy paper, a coated paper and a glossy film, and a plain paper such as so-called a copy paper, which has fibers exposed at least in part of the surface. In the present invention, in order that the formed image has high quality, a recording medium of a type which causes the porous layer to adsorb the dye (glossy recording medium or the like) can be used.

Each ink constituting the ink set of the present invention may be also used in combination with another ink, for an ink jet recording method. Such an ink includes, for instance, such an ink (thick ink) as a black ink, a red ink, a green ink and a blue ink. By further using the black ink concomitantly in the ink set, a high optical density required for a black image can be attained, and an image superior in contrast can be obtained. By concomitantly using the red ink, the green ink or the blue ink, the color developability of a secondary color image can be enhanced, and the color reproduction range which can be expressed by the inks can be expanded. Inks that have the same hues as the respective inks constituting the ink set of the present invention and contain a relatively small amount of dye (light inks) such as a light cyan ink, a light magenta ink and a light yellow ink can also be used in combination. By concomitantly using the light ink, the granularity of the image can be reduced.

EXAMPLES

The present invention will now be described in detail below with reference to Examples and Comparative Examples, but the present invention is not limited by the following Examples unless going beyond the scope of the invention. In addition, "%" is based on mass unless otherwise specified.

Evaluation of Image Storage Stability
Preparation of Ink

Each ink was prepared by mixing each component (unit: %) shown in Tables 1 to 3, sufficiently stirring and dissolving the component, and then pressure-filtering the liquid through a microfilter (product made by FUJIFILM Corporation) having a pore size of 0.2 μm. In the parentheses for the dyes in Tables 1 to 3, the type of the counter ion is described. Specific components of commercial products which were used for preparing each of the following inks are described below. PROXEL XL-2 is a mildewproofing agent made by Arch Chemicals, Inc. OLFINE E1010 and SURFYNOL: 104PG50, STG and MD20 are nonionic surfactants each made by Air Products and Chemicals, Inc. and Acetylenol E100 is a nonionic surfactant made by Kawaken Fine Chemicals Co. Ltd.

Cyan Ink (Table 1)

Exemplified compounds 1 to 3 and 6 are compounds which have the respective structures shown above and were those respectively synthesized in Examples 1, 2, 3 and 6 described in WO 2007/091631. Compounds of General Formula (I) are all mixtures, and a mixture including isomers is described as a "compound". In other words, the compound includes position isomers of the compound, position isomers of the nitrogen atom in the nitrogen-containing heteroaromatic ring, isomers each having a different ratio of benzo rings/nitrogen-containing heteroaromatic rings of A, B, C and D in General Formula (1), and α/β position isomers of the substituted or unsubstituted sulfamoyl group in the benzo ring. Exemplified compound 7 is also a compound which has the structure shown above and was the compound 102 described in Japanese Patent Application Laid-Open No. 2005-075778. A compound 1 was the compound which is described in WO 2007/120964 and is represented by the following structural formula (Formula IV). Among the prepared cyan inks, C-7 is equivalent to the ink of Example C-11 in Japanese Patent Application Laid-Open No. 2008-081693, C-9 is equivalent to the cyan ink of Example 1 in Japanese Patent Application Laid-Open No. 2005-162823, and C-11 is equivalent to the ink of C-01 in Table 1 in Japanese Patent Application Laid-Open No. 2007-138124.

Formula IV

TABLE 1

Table 1: Compositions of cyan inks

| | Cyan inks | | | | | | | | | | | |
|---|---|---|---|---|---|---|---|---|---|---|---|---|
| | C-1 | C-2 | C-3 | C-4 | C-5 | C-6 | C-7 | C-8 | C-9 | C-10 | C-11 | C-12 |
| Exemplified compound C1 (Na salt) | 5.0 | 4.5 | | | | 2.5 | | | | | | |
| Exemplified compound C2 (Na salt) | | | 4.5 | | | | | | | | | |
| Exemplified compound C3 (Na salt) | | | | 4.5 | | | | | | | | |
| Exemplified compound C6 (Na salt) | | | | | 4.5 | | | | | | | |
| Exemplified compound C7 (Li salt) | | 0.5 | 0.5 | 0.5 | 0.5 | 1.1 | 5.0 | 5.0 | 6.0 | 6.0 | 5.0 | 5.0 |
| C.I. acid blue 9 (Na salt) | | | | | | | | 0.2 | | | | |
| Glycerin | | | | | | | 10.0 | | 13.0 | | 11.0 | |
| Ethylene glycol | 9.0 | 9.0 | 9.0 | 9.0 | 9.0 | 9.0 | | | | 9.0 | | 9.0 |
| Diethylene glycol | 9.0 | 9.0 | 9.0 | 9.0 | 9.0 | 9.0 | | | | 9.0 | | 9.0 |
| Triethylene glycol | | | | | | | 8.0 | | 11.0 | | 10.0 | |
| 1,2-hexanediol | | | | | | | | | | | 3.5 | |
| 1,5-pentanediol | | | | | | | | 4.8 | | | | |
| 1-(2-hydroxyethyl)-2-pyrrolidinone | | | | | | | | 3.0 | | | | |
| Trimethylolpropane | | | | | | | | 4.8 | | | | |
| Triethylene glycol monobutyl ether | | | | | | | 10.0 | | 11.0 | | 9.0 | |
| 2-pyrrolidone | | | | | | | | 1.0 | 6.0 | | 3.5 | |
| Urea | | | | | | | | | 3.0 | | 1.0 | |
| Triethanolamine | | | | | | | 0.5 | | 0.7 | | 0.5 | |
| EDTA | | | | | | | 0.02 | | | | | |
| Benzotriazole | | | | | | | 0.01 | | 0.008 | | | |
| Compound 1 | | | | | | | | 2.0 | | | | |
| PROXEL XL-2 | | | | | | | 0.3 | | 0.35 | | 0.3 | |
| OLFINE E1010 | | | | | | | 1.0 | | | | | |
| Acetylenol E100 | 1.0 | 1.0 | 1.0 | 1.0 | 1.0 | 1.0 | | 1.0 | | 1.0 | | 1.0 |
| SURFYNOL 104PG50 | | | | | | | | | | | 1.1 | |
| SURFYNOL STG | | | | | | | | | 1.0 | | | |
| Pure water | 76.0 | 76.0 | 76.0 | 76.0 | 76.0 | 77.4 | 65.17 | 78.2 | 47.942 | 75.0 | 55.1 | 76.0 |

Magenta Ink (Table 2)

Exemplified compound 1 is the compound which has the structure shown above and was the compound of the compound number 1 described in WO 2008/066062. Exemplified compounds 2 and 3 are also compounds which have the respective structures shown above and were the compounds of d-5 and d-6, respectively described in Japanese Patent Application Laid-Open No. 2006-143989. The magenta dye 1 in Table 2 was Magenta dye 1 of the following structural formula (wherein M represents one of $NH_4$ and Na which satisfy $NH_4$:Na=1:1 (molar ratio)) which is described in an Example of Japanese Patent Application Laid-Open No. 2008-081693. The magenta dye 2 was the compound of M1 described in TABLE II of WO 2007/120964. The magenta dye 2 is the dye which has the same structure as M-1 of the Example described in Japanese Patent Application Laid-Open No. 2005-162823. The compound 2 was the compound (b-3) which is represented by the following structural formula described in Japanese Patent Application Laid-Open No. 2008-081693. Among the prepared magenta inks, M-5 is equivalent to Example M-13 in Japanese Patent Application \Laid-Open No. 2008-081693, M-7 is equivalent to the magenta ink of Example 1 in Japanese Patent Application Laid-Open No. 2005-162823, and M-9 is equivalent to the ink of M-01 in Table 1 in Japanese Patent Application Laid-Open No. 2007-138124.

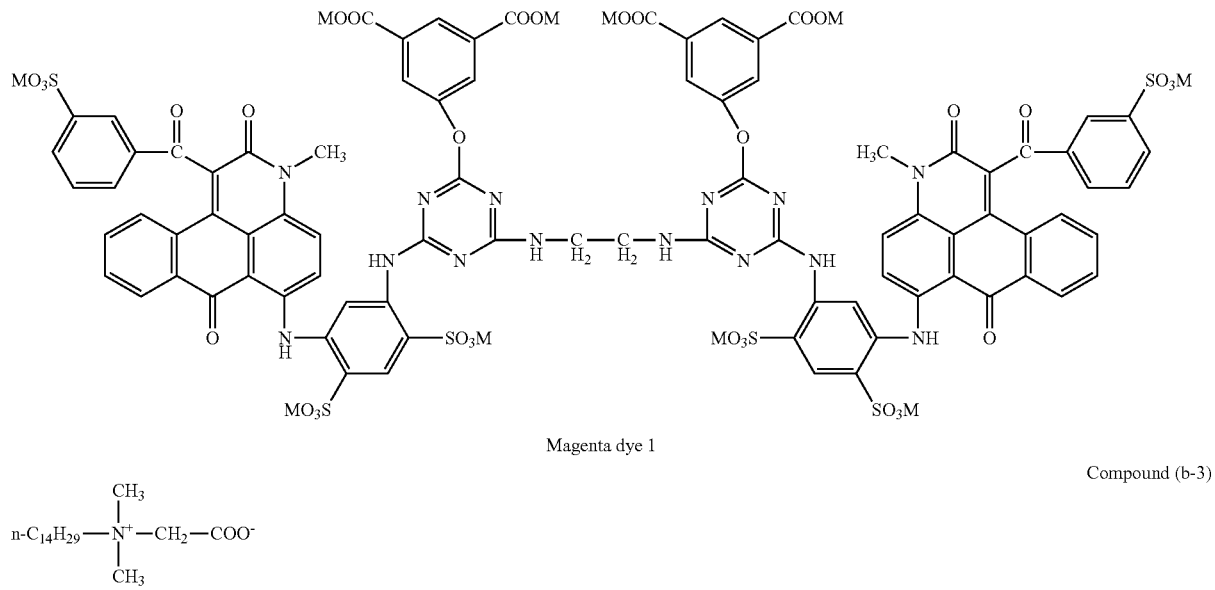

Magenta dye 1

Compound (b-3)

TABLE 2

Table 2: Compositions of magenta inks

| | Magenta inks | | | | | | | | | |
|---|---|---|---|---|---|---|---|---|---|---|
| | M-1 | M-2 | M-3 | M-4 | M-5 | M-6 | M-7 | M-8 | M-9 | M-10 |
| Exemplified compound M1 (Na salt) | | 0.5 | 0.5 | 5.9 | | | | | | |
| Exemplified compound M2 (Li salt) | 5.0 | 4.5 | | 0.6 | 1.0 | | | | 3.2 | 3.2 |
| Exemplified compound M3 (Li salt) | | | 4.5 | | | | | | | |
| Magenta dye 1 ($NH_4$ salt•Na salt) | | | | | 5.0 | | | | | |
| Magenta dye 2 (Na salt) | | | | | | 5.0 | 2.3 | 2.3 | | |
| Glycerin | 7.5 | 7.5 | 7.5 | 7.5 | 8.0 | | 7.0 | 7.5 | 10.0 | 7.5 |
| Diethylene glycol | 7.5 | 7.5 | 7.5 | 7.5 | | | 9.0 | 7.5 | | 7.5 |
| Triethylene glycol | | | | | 6.0 | | | | 2.0 | |
| 1,2-hexandiol | | | | | 2.0 | | | | 1.0 | |
| Triethylene glycol monobutyl ether | | | | | 9.0 | | 7.0 | | 10.0 | |
| 1,5-pentanediol | | | | | | 2.2 | | | | |
| Trimethylolpropane | | | | | | 11.0 | | | | |
| 2-pyrrolidone | | | | | 2.0 | 7.5 | | | 0.5 | |
| Urea | 7.5 | 7.5 | 7.5 | 7.5 | 5.0 | | 1.5 | 7.5 | 2.0 | 7.5 |
| Triethanolamine | | | | | 0.5 | | 0.69 | | 0.5 | |
| Compound 2 | | | | | 1.0 | | | | 3.2 | |
| EDTA | | | | | 0.02 | | | | | |
| Benzotriazole | | | | | 0.01 | | | | | |
| LiOH•1 monohydrate | | | | | | | | | 1.0 | |
| PROXEL XL-2 | | | | | 0.3 | | 0.5 | | 0.5 | |
| SURFYNOL104PG50 | | | | | 1.0 | | | | 1.0 | |
| SURFYNOL MD20 | | | | | 0.2 | | | | | |
| Acetylenol E100 | 1.0 | 1.0 | 1.0 | 1.0 | | 1.0 | | 1.0 | | 1.0 |
| SURFYNOL STG | | | | | | 1.0 | | | | |
| Pure water | 71.5 | 71.5 | 71.5 | 70.0 | 58.97 | 73.3 | 71.01 | 74.2 | 65.1 | 73.3 |

Yellow Ink (Table 3)

Exemplified compounds Y3, Y5 and Y7 are compounds which have the respective structures shown above and were respectively DYE-9, DYE-11 and DYE-13 described in WO 2006/082669. Exemplified compound Y12 is also the compound which has the structure shown above and was the azo compound represented by Formula (7) of Example 1 described in WO 2008/053776. The yellow dye 1 was Yellow dye 2 of the Example described in Japanese Patent Application Laid-Open No. 2008-081693. The yellow dye 2 was the dye of Y-1 in the Example described in Japanese Patent Application Laid-Open No. 2005-162823. The yellow dye 3 was Y-1189 (made by ILFORD Imaging Switzerland GmbH) represented by the following structure. Among the prepared yellow inks, Y-6 is equivalent to Y-12 in the Example in Japanese Patent Application Laid-Open No. 2008-081693, Y-10 is equivalent to the yellow ink in Example 1 in Japanese Patent Application Laid-Open No. 2005-162823, and Y-12 is equivalent to the ink of Y-01 in Table 1 in Japanese Patent Application Laid-Open No. 2007-138124.

Production of Recorded Article, and Calculation of Optical Density Retention

The inks obtained above were filled into respective ink cartridges, and the obtained ink cartridges were each mounted on a modified ink jet recording apparatus (PIXUS 9900i; made by Canon Inc.). A solid image in which the recording duty was gradually changed between 0 to 100% with an increment of 5% was formed with each single-color ink of cyan, magenta and yellow on a recording medium (Canon photographic paper-gloss pro (platinum grade) made by Canon Inc.) Thus obtained recorded article includes an image region having an optical density of 1.0±10%. The optical density in the image region having the optical density of 1.0±10% was measured with the use of a spectrophotometer (Spectorolino made by Gretag Macbeth Co.) under conditions where the light source was D50 and the visual field was 2°. This optical density was referred to as "optical density before test". After each of the following tests had been conducted, the optical density was measured on the same region as the image region in which the optical density had been

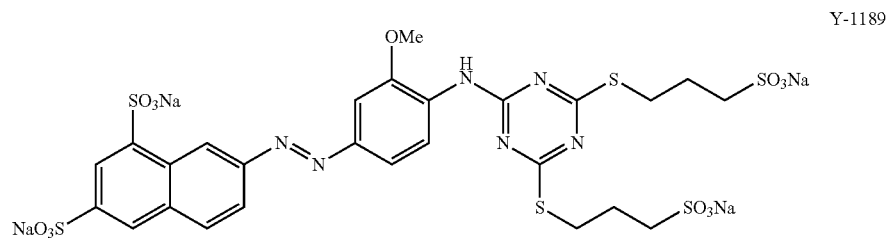

Y-1189

TABLE 3

Table 3: Compositions of yellow inks

| | Yellow inks | | | | | | | | | | | |
|---|---|---|---|---|---|---|---|---|---|---|---|---|
| | Y-1 | Y-2 | Y-3 | Y-4 | Y-5 | Y-6 | Y-7 | Y-8 | Y-9 | Y-10 | Y-11 | Y-12 |
| Exemplified compound Y3 (K salt) | | | | | | 4.0 | | | | | | |
| Exemplified compound Y5 (K salt) | 5.0 | 4.5 | 4.0 | 3.5 | | | 3.0 | 3.5 | | | | 5.0 |
| Exemplified compound Y7 (K salt) | | | | | 4.0 | | | | | | | |
| Exemplified compound Y12 (Na salt) | | 0.5 | 1.0 | 1.5 | 1.0 | 1.0 | 1.0 | | | | | |
| Yellow dye 1 (Na salt) | | | | | | | | 1.5 | | | | |
| Yellow dye 2 (K salt) | | | | | | | | | | 3.5 | 3.5 | |
| Yellow dye 3 (Na salt) | | | | | | | | | 5.0 | | | |
| Glycerin | | | | | | | | 10.0 | | 11.5 | | 9.0 |
| Ethylene glycol | 9.0 | 9.0 | 9.0 | 9.0 | 9.0 | 9.0 | 9.0 | | | | 9.0 | |
| Diethylene glycol | 9.0 | 9.0 | 9.0 | 9.0 | 9.0 | 9.0 | 9.0 | | | 12.0 | 9.0 | |
| Triethylene glycol | | | | | | | | 10.0 | | | | 9.0 |
| Triethylene glycol monobutyl ether | | | | | | | | 10.0 | | 13.0 | | 9.0 |
| Tetraethylene glycol | | | | | | | | | 4.9 | | | |
| Trimethylolpropane | | | | | | | | | 1.2 | | | |
| 2-pyrrolidone | | | | | | | | 5.5 | 3.5 | | | 2.0 |
| Urea | | | | | | | | | 1.0 | | | 1.0 |
| Triethanolamine | | | | | | | | 0.1 | 0.8 | | | 0.7 |
| EDTA | | | | | | | | 0.02 | | | | |
| Benzotriazole | | | | | | | | 0.01 | | 0.008 | | |
| PROXEL XL-2 | | | | | | | | 0.3 | | 0.4 | | 0.5 |
| SURFYNOL 104PG50 | | | | | | | | 1.0 | | | | |
| Acetylenol E100 | 1.0 | 1.0 | 1.0 | 1.0 | 1.0 | 1.0 | 1.0 | | 1.0 | | 1.0 | |
| SURFYNOL STG | | | | | | | | | | 1.0 | | |
| Pure water | 76.0 | 76.0 | 76.0 | 76.0 | 76.0 | 76.0 | 77.0 | 63.57 | 82.4 | 53.342 | 77.5 | 63.8 | measured before the test, with the same apparatus and on the same conditions as above. This optical density was referred to as "optical density after test". The value of the optical density retention was calculated from each of the optical densities before and after the test, based on the following formula.

$$\text{Optical density retention}[\%] = \frac{\text{Optical density after test}}{\text{Optical density before test}} \times 100$$

Evaluation

Ozone Resistance Test 1: Integral Ozone Concentration of 800 ppm·hr

After the above-described recorded article had been produced, the recorded article was left at room temperature for one day. After that, this recorded article was placed into an ozone test apparatus (OMS-H made by Suga Test Instruments Co., Ltd.). The recorded article was exposed to ozone with an ozone concentration of 5 ppm, at a temperature of 23° C. and in a humidity of 50% RH for 160 hours, so that it was exposed to ozone until the integral ozone concentration reached 800 ppm·hr. Then, the value of the optical density after the test was measured as described above, and the value of the optical density retention was calculated. The results are shown in Table 4.

Xenon Light Resistance Test 1: Integral Irradiance of 43,800 klx·hr

After the above-described recorded article had been produced, the recorded article was left at room temperature for one day. After that, this recorded article was placed into a xenon light test apparatus (low-temperature cycle xenon weather meter XL-75C made by Suga Test Instruments Co., Ltd.). Then, the recorded article was irradiated with xenon light having an illuminance of 50 klx, at an air temperature in the tank of 23° C., in a humidity of 50% RH and at a temperature of 23° C. on a black panel, until the integral irradiance reached 43,800 klx·hr. Then, the value of the optical density after the test was measured as described above, and the value of the optical density retention was calculated. The results are shown in Table 4.

Evaluation of Ink Sets: Ozone Resistance Test 1 and Xenon Light Resistance Test 1

Ink sets were prepared by combining the respective inks obtained above as shown in Table 5. The ink set of Comparative Example 2 is equivalent to the ink set of Example 3 in Japanese Patent Application Laid-Open No. 2008-081693. Then, each ink set was evaluated for the recorded article which had been produced with the use of the respective inks constituting the ink set, based on the optical density retentions before and after an ozone resistance test 1 and a xenon light resistance test 1. The evaluation criteria are described below. The results are shown in Table 5.

Optical Density Retention

Each ink set was evaluated based on the following criteria, by using the minimum value among the optical density retentions shown by each ink of cyan, magenta and yellow constituting the ink set. It can be determined by evaluating the ink set based on the minimum value whether the optical density retention of each ink constituting the ink set satisfies 70% or more, or 80% or more.

A: Minimum value of optical density retention is 80% or more

B: Minimum value of optical density retention is 70% or more and less than 80%

C: Minimum value of optical density retention is less than 70%

Maximum Value of Differences of Optical Density Retentions

The maximum value of the differences of the optical density retentions among the images which had been formed by each ink of cyan, magenta and yellow constituting the ink set was determined, and the ink set was evaluated based on the following criteria.

A: Maximum value of differences of optical density retentions is 10 or less

B: Maximum value of differences of optical density retentions is more than 10 and 15 or less C: Maximum value of differences of optical density retentions is more than 15

TABLE 4

Table 4: Values of optical density retention [%]

| | | Ozone resistance test 1 | Xenon light resistance test 1 | | | Ozone resistance test 1 | Xenon light resistance test 1 | | | Ozone resistance test 1 | Xenon light resistance test 1 |
|---|---|---|---|---|---|---|---|---|---|---|---|
| Cyan inks | C-1 | 77 | 96 | Magenta inks | M-1 | 73 | 94 | Yellow inks | Y-1 | 81 | 95 |
| | C-2 | 76 | 94 | | M-2 | 72 | 89 | | Y-2 | 78 | 87 |
| | C-3 | 76 | 94 | | M-3 | 70 | 85 | | Y-3 | 75 | 79 |
| | C-4 | 76 | 94 | | M-4 | 68 | 75 | | Y-4 | 72 | 72 |
| | C-5 | 74 | 94 | | M-5 | 67 | 84 | | Y-5 | 75 | 75 |
| | C-6 | 78 | 98 | | M-6 | 67 | 85 | | Y-6 | 73 | 72 |
| | C-7 | 67 | 96 | | M-7 | 80 | 94 | | Y-7 | 69 | 69 |
| | C-8 | 59 | 87 | | M-8 | 70 | 90 | | Y-8 | 79 | 80 |
| | C-9 | 80 | 95 | | M-9 | 85 | 98 | | Y-9 | 43 | 58 |
| | C-10 | 67 | 96 | | M-10 | 73 | 94 | | Y-10 | 97 | 92 |
| | C-11 | 85 | 95 | | | | | | Y-11 | 95 | 86 |
| | C-12 | 67 | 96 | | | | | | Y-12 | 99 | 82 |

TABLE 5

Table 5: Compositions and evaluation results of ink sets

|  |  | Compositions of ink sets | | | Evaluation results | | | |
|---|---|---|---|---|---|---|---|---|
|  |  | | | | Ozone resistance test 1 | | Xenon light resistance test 1 | |
|  |  | Cyan ink | Magenta ink | Yellow ink | Optical density retention | The maximum value of differences of optical density retention | Optical density retention | The maximum value of differences of optical density retention |
| Examples | 1 | C-1 | M-1 | Y-1 | B | A | A | A |
|  | 2 | C-2 | M-1 | Y-2 | B | A | A | A |
|  | 3 | C-2 | M-2 | Y-1 | B | A | A | A |
|  | 4 | C-2 | M-2 | Y-8 | B | A | A | B |
|  | 5 | C-2 | M-2 | Y-3 | B | A | B | B |
|  | 6 | C-3 | M-2 | Y-3 | B | A | B | B |
|  | 7 | C-4 | M-2 | Y-3 | B | A | B | B |
|  | 8 | C-5 | M-2 | Y-3 | B | A | B | B |
|  | 9 | C-2 | M-3 | Y-3 | B | A | B | B |
| Comparative Examples | 1 | C-2 | M-2 | Y-4 | B | A | B | C |
|  | 2 | C-2 | M-2 | Y-5 | B | A | B | C |
|  | 3 | C-2 | M-2 | Y-6 | B | A | B | C |
|  | 4 | C-2 | M-4 | Y-3 | C | A | B | C |
|  | 5 | C-2 | M-4 | Y-7 | C | A | C | C |
|  | 6 | C-6 | M-2 | Y-3 | B | A | B | C |
|  | 7 | C-6 | M-5 | Y-3 | C | B | B | C |
|  | 8 | C-6 | M-4 | Y-7 | C | A | C | C |
|  | 9 | C-7 | M-5 | Y-8 | C | B | A | C |
|  | 10 | C-8 | M-6 | Y-9 | C | C | C | C |
|  | 11 | C-9 | M-7 | Y-10 | A | C | A | A |
|  | 12 | C-10 | M-8 | Y-11 | C | C | A | A |
|  | 13 | C-11 | M-9 | Y-12 | A | B | A | C |
|  | 14 | C-12 | M-10 | Y-1 | C | B | A | A |

Ozone Resistance Test 2: Integral Ozone Concentration of 1,000 ppm·hr

The recorded article was exposed to ozone until the integral ozone concentration reached 1,000 ppm·hr, in a similar way to the above-described ozone resistance test 1, except that the exposure time was changed to 200 hours. Then, the value of the optical density after the test was measured as described above, and the value of the optical density retention was calculated. The results are shown in Table 7.

Xenon Light Resistance Test 2: Integral Irradiance of 65,700 klx·hr

The recorded article was irradiated with the xenon light in a similar way to the above-described xenon light resistance test 1, except that the recorded article was irradiated with the xenon light until the integral irradiance reached 65,700 klx·hr. The value of the optical density after the test was measured as described above, and the value of the optical density retention was calculated. The results are shown in Table 6.

TABLE 6

Table 6: Values of optical density retention [%]

|  |  | Ozone resistance test 2 | Xenon light resistance test 2 |  |  | Ozone resistance test 2 | Xenon light resistance test 2 |  |  | Ozone resistance test 2 | Xenon light resistance test 2 |
|---|---|---|---|---|---|---|---|---|---|---|---|
| Cyan inks | C-1 | 75 | 94 | Megenta inks | M-1 | 70 | 91 | Yellow inks | Y-1 | 78 | 90 |
|  | C-2 | 73 | 90 |  | M-2 | 68 | 75 |  | Y-2 | 76 | 75 |
|  | C-3 | 73 | 90 |  | M-3 | 65 | 67 |  | Y-3 | 72 | 59 |
|  | C-4 | 73 | 90 |  | M-4 | 62 | 51 |  | Y-4 | 68 | 44 |
|  | C-5 | 73 | 90 |  | M-5 | 63 | 74 |  | Y-5 | 72 | 51 |
|  | C-6 | 74 | 94 |  | M-6 | 61 | 69 |  | Y-6 | 70 | 46 |
|  | C-7 | 63 | 92 |  | M-7 | 77 | 90 |  | Y-7 | 65 | 45 |
|  | C-8 | 92 | 77 |  | M-8 | 65 | 85 |  | Y-8 | 75 | 76 |
|  | C-9 | 75 | 91 |  | M-9 | 82 | 95 |  | Y-9 | 33 | 24 |
|  | C-10 | 62 | 92 |  | M-10 | 70 | 91 |  | Y-10 | 95 | 72 |
|  | C-11 | 80 | 91 |  |  |  |  |  | Y-11 | 70 | 70 |
|  | C-12 | 62 | 92 |  |  |  |  |  | Y-12 | 97 | 75 |

Evaluation of Ink Sets: Ozone Resistance Test 2 and Xenon Light Resistance Test 2

Evaluation of the above-described ink sets: The ink sets were evaluated based on the optical density retention before and after the ozone resistance test 2 and the xenon light resistance test 2, in the same method and evaluation criteria as in the ozone resistance test 1 and the xenon light resistance test 1. The results are shown in Table 7.

TABLE 7

Table 7: Compositions and evaluation results of ink sets

|  |  | Compositions of ink sets | | | Evaluation results | | | |
| --- | --- | --- | --- | --- | --- | --- | --- | --- |
|  |  | | | | Ozone resistance test 2 | | Xenon light resistance test 2 | |
|  |  | Cyan ink | Magenta ink | Yellow ink | Optical density retention | The maximum value of differences of optical density retention | Optical density retention | The maximum value of differences of optical density retention |
| Examples | 1 | C-1 | M-1 | Y-1 | B | A | A | A |
|  | 2 | C-2 | M-1 | Y-2 | B | A | B | C |
|  | 3 | C-2 | M-2 | Y-1 | C | A | B | B |
|  | 4 | C-2 | M-2 | Y-8 | C | A | B | B |
|  | 5 | C-2 | M-2 | Y-3 | C | A | C | C |
|  | 6 | C-3 | M-2 | Y-3 | C | A | C | C |
|  | 7 | C-4 | M-2 | Y-3 | C | A | C | C |
|  | 8 | C-5 | M-2 | Y-3 | C | A | C | C |
|  | 9 | C-2 | M-3 | Y-3 | C | A | C | C |
| Comparative Examples | 1 | C-2 | M-2 | Y-4 | C | A | C | C |
|  | 2 | C-2 | M-2 | Y-5 | C | A | C | C |
|  | 3 | C-2 | M-2 | Y-6 | C | A | C | C |
|  | 4 | C-2 | M-4 | Y-3 | C | B | C | C |
|  | 5 | C-2 | M-4 | Y-7 | C | B | C | C |
|  | 6 | C-6 | M-2 | Y-3 | C | A | C | C |
|  | 7 | C-6 | M-5 | Y-3 | C | B | C | C |
|  | 8 | C-6 | M-4 | Y-7 | C | B | C | C |
|  | 9 | C-7 | M-5 | Y-8 | C | B | B | C |
|  | 10 | C-8 | M-6 | Y-9 | C | C | C | C |
|  | 11 | C-9 | M-7 | Y-10 | B | C | B | C |
|  | 12 | C-10 | M-8 | Y-11 | C | A | B | C |
|  | 13 | C-11 | M-9 | Y-12 | A | C | B | C |
|  | 14 | C-12 | M-10 | Y-1 | C | C | A | A |

Each ink set of the Examples was evaluated in the same way as described above, under conditions where neither the dye type nor the content shown in Tables 1 to 3 was changed and other components were changed to the above-described compositions of the inks for evaluation, and as a result, equivalent evaluation results as those in Table 5 and Table 7 were obtained. This means that the evaluation result of the composition of each ink constituting the actual ink set is equal to the evaluation result obtained by the composition of the above-described ink for evaluation. In the above description, the ink set was described as including the inks having a composition which was adjusted according to the characteristics of the dye and the ejection method, but it can be considered that the present invention is effective as an ink set in which the combination of the dyes was selected by using the inks for evaluation and a method of selecting the combination of the dyes.

In addition, the recording medium was changed to a Canon photographic paper-gloss gold (made by Canon Inc.), and the ink set was evaluated in the same way as above, and the evaluation result was equal to that of the case of the above-described recording medium (Canon photographic paper-gloss pro (platinum grade) made by Canon Inc.).

Evaluation of Ink Reliability

Determination of Poor Medium/Good Medium

In order to evaluate the reliability of the ink, it was determined what type of relationship there was between a dye and a water-soluble organic solvent which were contained in an ink. A water-soluble organic solvent being an object to be determined (when the water-soluble organic compound is solid, it was a 20% aqueous solution of the solid) and a sufficient amount of the dye were placed into a sample bottle having a capacity of 20 cc, and the liquid was stirred overnight. This liquid was centrifuged for 10 minutes at 12,000 rpm, the dye which did not dissolve in the liquid was settled, and then the absorbance of the supernatant liquid was measured. Then, the solubility of the dye with respect to the water-soluble organic solvent being the object to be determined (or 20% aqueous solution) was determined from the ratio of the measured absorbance to the previously measured absorbance of an aqueous solution having a predetermined concentration of the dye. From the obtained solubility, a water-soluble organic solvent having a solubility of 5% or less was determined to be a poor medium, and a water-soluble organic solvent having a solubility of more than 5% was determined to be a good medium. Table 8 shows the type of the dye and the determination result (in which a good medium is represented by 'good' and a poor medium is represented by 'poor').

TABLE 8

Table 8: Determination results for poor medium/good medium

|  |  | Dyes | | | |
|---|---|---|---|---|---|
|  |  | Exemplified compound C1 | Exemplified compound M1 | Exemplified compound M2 | Exemplified compound Y5 |
| Water-soluble organic solvent | Glycerin | good | good | good | good |
|  | Ethylene glycol | good | good | good | good |
|  | Diethylene glycol | good | good | good | good |
|  | Triethylene glycol | good | good | good | good |
|  | Propylene glycol | good | good | good | good |
|  | Triethylene glycol monobutyl ether | good | good | good | good |
|  | 1-(2-hydroxyethyl)-2-pyrrolidinone | good | good | good | good |
|  | 2-methyl-1,3-propanediol | poor | poor | good | poor |
|  | 1,2-hexandiol | poor | poor | good | poor |
|  | 1,5-pentanediol | poor | poor | good | poor |

Preparation of Ink

Each ink was prepared by mixing each component (unit: %) shown in the upper section of Table 9, sufficiently stirring and dissolving the components, and then pressure-filtering the liquid through a microfilter (product made by FUJIFILM Corporation) having a pore size of 0.2 μm. In the parentheses for the dyes in Table 9, the type of the counter ion is described. In addition, Acetylenol E100 which was used for preparing each of the following inks is a nonionic surfactant made by Kawaken Fine Chemicals Co., Ltd. The values of the contents (unit: %) of the good medium and the poor medium in ink, and the mass ratio (unit:time) of the poor medium to the good medium are shown in the lower section of Table 9.

recording apparatus was left in an environment of a temperature of 30° C. and a relative humidity of 10% for 5 hours in a state of ejecting nothing, was stabilized and then was made to eject the ink in the same environment. After that, the ejection was suspended for 5 seconds, and the recording apparatus was made to eject the ink again without conducting a recovery operation of the recording head to record vertically ruled lines on a recording medium (HR-101 made by Canon Inc.). The intermittent ejection stability was evaluated by visually observing the obtained recorded article. The evaluation criteria for the intermittent ejection stability are described below. The results are shown in Table 10. In the present invention, 'A' and 'B' in the following evaluation criteria are

TABLE 9

Table 9: Compositions of inks

| | Types of inks | | | | | | | | | | | | | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| Exemplified compound C1 (Na salt) | 5.0 |  |  | 5.0 | 5.0 | 5.0 | 5.0 |  |  | 5.0 | 5.0 |  |  | 5.0 |  |  |
| Exemplified compound M1 (Na salt) |  | 5.9 |  |  |  |  |  | 5.9 |  |  |  | 5.9 |  |  | 5.9 |  |
| Exemplified compound M2 (Li salt) |  | 0.8 |  |  |  |  |  | 0.8 |  |  |  | 0.8 |  |  | 0.8 |  |
| Exemplified compound Y5 (K salt) |  |  | 5.0 |  |  |  |  |  | 5.0 |  |  |  | 5.0 |  |  | 5.0 |
| Glycerin |  |  |  |  |  |  |  |  |  |  |  |  |  | 9.0 | 9.0 | 9.0 |
| Ethylene glycol | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| Diethylene glycol | 9.0 | 9.0 | 9.0 |  |  |  |  |  |  |  |  |  |  |  |  |  |
| Triethylene glycol |  |  |  | 9.0 |  |  |  |  |  | 9.0 |  |  |  |  |  |  |
| Propylene glycol |  |  |  |  | 9.0 |  |  |  |  |  |  |  |  |  |  |  |
| Triethylene glycol monobutyl ether |  |  |  |  |  | 9.0 |  | 9.0 |  |  |  |  |  |  |  |  |
| 1-(2-hydroxyethyl)-2-pyrrolidinone |  |  |  |  |  |  | 9.0 |  |  |  |  |  |  |  |  |  |
| 2-methyl-1,3-propanediol |  |  |  |  |  |  |  |  |  |  | 9.0 |  | 9.0 |  |  |  |
| 1,2-hexandiol |  |  |  |  |  |  |  |  |  | 9.0 | 9.0 |  |  |  |  |  |
| 1,5-pentanediol |  |  |  |  |  |  |  |  |  |  |  |  |  | 9.0 | 9.0 | 9.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Pure water | 76.0 | 74.3 | 76.0 | 76.0 | 76.0 | 76.0 | 76.0 | 74.3 | 76.0 | 76.0 | 76.0 | 74.3 | 76.0 | 67.0 | 65.3 | 67.0 |
| Content of good medium [%] | 18.0 | 18.0 | 18.0 | 18.0 | 18.0 | 18.0 | 18.0 | 18.0 | 18.0 | 9.0 | 9.0 | 9.0 | 9.0 | 18.0 | 18.0 | 18.0 |
| Content of poor medium [%] | 0.0 | 0.0 | 0.0 | 0.0 | 0.0 | 0.0 | 0.0 | 0.0 | 0.0 | 9.0 | 9.0 | 9.0 | 9.0 | 9.0 | 9.0 | 9.0 |
| Poor medium/good medium [times] | 0.0 | 0.0 | 0.0 | 0.0 | 0.0 | 0.0 | 0.0 | 0.0 | 0.0 | 1.0 | 1.0 | 1.0 | 1.0 | 0.5 | 0.5 | 0.5 |

Evaluation

Intermittent Ejection Stability

The inks obtained above were filled into respective ink cartridges, and the obtained ink cartridges were each mounted on a modified ink jet recording apparatus (PIXUS iP8600 made by Canon Inc.) which ejects the ink by an action of thermal energy. The ejection volume of the recording head which was used at this time was approximately 2 pL. This at a level which has a sufficient performance, 'A' is at an excellent level, and 'C' is at an unacceptable level.

A: The vertically ruled line showed no disarray.

B: The vertically ruled line showed slight disarray.

C: The vertically ruled line showed non-ejected portion or disarray and could not be recorded normally.

Sticking Resistance

The inks obtained above were filled into respective ink cartridges, and the obtained ink cartridges were each mounted on an ink jet recording apparatus (PIXUS iP8600 made by Canon Inc.) which ejects the ink by an action of thermal energy. The ink jet recording apparatus was subjected to a recovery (cleaning) operation beforehand, and a nozzle check pattern of PIXUS iP8600 was recorded on a recording medium. Subsequently, while the carriage was working, the power cable was pulled out and thereby the recording head was left in a state of not being capped. In this state, the ink jet recording apparatus was left in an environment of a temperature of 30° C. and a relative humidity of 10% RH for 14 days. Afterward, the ink jet recording apparatus was left at a temperature of 25° C. for 6 hours to return itself to room temperature. The image was recorded while the ink jet recording apparatus conducted a recovery operation, and the sticking resistance was evaluated. The evaluation criteria of the sticking resistance are described below. The results are shown in Table 10. In the present invention, 'A' and 'B' in the following evaluation criteria are at a level which has a sufficient performance, 'A' is at an excellent level, and 'C' is at an unacceptable level.

A: After the recovery operation was carried out once or twice, the image could be normally recorded.

B: After the recovery operation was carried out three to ten times, the image could be normally recorded.

C: The image could not be normally recorded by the recovery operation of ten times or less.

TABLE 10

Table 10: Evaluation results

|  |  | Intermittent ejection stability | Sticking resistance |
|---|---|---|---|
| Types of inks | 1 | B | B |
|  | 2 | B | B |
|  | 3 | B | B |
|  | 4 | B | A |
|  | 5 | B | A |
|  | 6 | B | A |
|  | 7 | B | A |
|  | 8 | B | A |
|  | 9 | B | A |
|  | 10 | A | B |
|  | 11 | A | B |
|  | 12 | A | B |
|  | 13 | A | B |
|  | 14 | A | A |
|  | 15 | A | A |
|  | 16 | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282281, filed Dec. 11, 2009, which is hereby incorporated by reference herein in its entirety.

What is claimed is:

1. An ink set comprising a cyan ink, a magenta ink and a yellow ink, wherein a combination of a cyan dye contained in the cyan ink, a magenta dye contained in the magenta ink and a yellow dye contained in the yellow ink is selected so as to satisfy the condition that optical density retentions of images formed by a cyan ink for evaluation containing the cyan dye, a magenta ink for evaluation containing the magenta dye and a yellow ink for evaluation containing the yellow dye, as determined before and after an ozone resistance test with an integral ozone concentration of 800 ppm·hr and before and after a xenon light resistance test with an integral irradiance of 43,800 klx·hr, are 70% or more for each of the inks for evaluation and are such that a maximum value of differences of the optical density retentions among the images formed by the respective inks for evaluation is 15 or less.

2. The ink set according to claim 1, wherein the maximum value of differences of the optical density retentions among the images formed by the respective inks for evaluation is 10 or less, as determined before and after the ozone resistance test and before and after the xenon light resistance test.

3. The ink set according to claim 1, wherein optical density retentions of images formed by the respective inks for evaluation, as determined before and after an ozone resistance test with an integral ozone concentration of 1,000 ppm·hr, are 70% or more, and the maximum value of differences of the optical density retentions among the images formed by the respective inks for evaluation is 15 or less.

4. The ink set according to claim 1, wherein optical density retentions of images formed by the respective inks for evaluation, as determined before and after a xenon light resistance test with an integral irradiance of 65,700 klx·hr, are 70% or more, and the maximum value of differences of the optical density retentions among the images formed by the respective inks for evaluation is 15 or less.

5. The ink set according to claim 1, wherein the cyan ink, the magenta ink and the yellow ink which comprise the ink set each comprise a poor medium for a dye.

6. The ink set according to claim 1, wherein the cyan ink, the magenta ink and the yellow ink which comprise the ink set each comprise a good medium for dye.

7. The ink set according to claim 1, wherein the cyan ink, the magenta ink and the yellow ink which comprise the ink set each comprise a poor medium and a good medium for a dye.

8. An ink cartridge having an ink storage portion for storing an ink therein, wherein the ink stored in the ink storage portion is at least one ink selected from the cyan ink, the magenta ink and the yellow ink which comprise the ink set according to claim 1.

9. An ink jet recording method comprising forming an image on a recording medium by ejecting ink with an ink jet system, wherein the step of forming an image uses the cyan ink, the magenta ink and the yellow ink which comprise the ink set according to claim 1.

10. An ink jet recording apparatus comprising an ink storage portion for storing an ink therein and a recording head for ejecting the ink, wherein the ink stored in the ink storage portion is at least one ink selected from the cyan ink, the magenta ink and the yellow ink which comprise the ink set according to claim 1.

* * * * *